(12) United States Patent
Liu et al.

(10) Patent No.: US 12,078,856 B2
(45) Date of Patent: Sep. 3, 2024

(54) PHOTONIC STRUCTURE AND SEMICONDUCTOR STRUCTURE AND METHOD FOR MANUFACTURING THE SAME HAVING THROUGH AND TRENCH ISOLATIONS

(71) Applicant: TAIWAN SEMICONDUCTOR MANUFACTURING COMPANY LTD., Hsinchu (TW)

(72) Inventors: Tao-Cheng Liu, Hsinchu (TW); Ying-Hsun Chen, Taoyuan (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 103 days.

(21) Appl. No.: 17/672,505

(22) Filed: Feb. 15, 2022

(65) Prior Publication Data
US 2023/0043634 A1    Feb. 9, 2023

Related U.S. Application Data

(60) Provisional application No. 63/230,665, filed on Aug. 6, 2021.

(51) Int. Cl.
*G02B 6/42* (2006.01)
*G02B 6/43* (2006.01)

(52) U.S. Cl.
CPC ......... *G02B 6/4295* (2013.01); *G02B 6/4236* (2013.01); *G02B 6/43* (2013.01)

(58) Field of Classification Search
None
See application file for complete search history.

(56) References Cited

U.S. PATENT DOCUMENTS

| | | | | |
|---|---|---|---|---|
| 10,274,678 | B1 * | 4/2019 | Liu | H01L 21/30608 |
| 10,641,958 | B2 * | 5/2020 | Liu | H01L 21/3086 |
| 10,872,818 | B2 * | 12/2020 | Chiang | H01L 21/743 |
| 10,928,590 | B2 * | 2/2021 | Liu | H01L 21/3086 |
| 11,715,728 | B2 * | 8/2023 | Yu | H01L 31/02325 257/431 |
| 2019/0293867 | A1 * | 9/2019 | Liu | H01L 21/30608 |
| 2020/0235159 | A1 * | 7/2020 | Huang | H01L 25/043 |
| 2020/0249397 | A1 * | 8/2020 | Liu | G02B 6/136 |
| 2021/0199889 | A1 * | 7/2021 | Liu | G02B 5/1819 |
| 2022/0155535 | A1 * | 5/2022 | Bian | G02B 6/4204 |
| 2023/0043634 | A1 * | 2/2023 | Liu | G02B 6/124 |
| 2023/0324609 | A1 * | 10/2023 | Chung | G02B 6/12002 |

* cited by examiner

Primary Examiner — Andrew Jordan
(74) Attorney, Agent, or Firm — WPAT LAW; Anthony King

(57) ABSTRACT

A photonic structure is provided. The photonic structure includes a guiding region, a sensing region, and logic region. The guiding region has a first side and a second side opposite to the first side. The sensing region is disposed on the second side of the guiding region. The logic region is disposed on a side of the sensing region opposite to the guiding region. The guiding region, the sensing region, and the logic region are stacked along a vertical direction. A method for manufacturing the photonic structure is also provided.

20 Claims, 23 Drawing Sheets

PHOTONIC STRUCTURE AND SEMICONDUCTOR STRUCTURE AND METHOD FOR MANUFACTURING THE SAME HAVING THROUGH AND TRENCH ISOLATIONS

PRIORITY CLAIM AND CROSS-REFERENCE

This application claims priority to U.S. Provisional Application No. 63/230,665 filed Aug. 6, 2021, the disclosures of which are hereby incorporated by reference in its entirety.

BACKGROUND

Optical gratings are frequently used to enable communication between light sources and other components (e.g., photodetectors). For example, the optical grating can be used to redirect light from an optical fiber into an optical detector. Light passing from one end of the optical grading and through the optical grating may reflect off an inner surface of the grating at a shallow angle. Such light may be redirected so that it strikes the inner surface at an angle greater than the critical angle, thus allowing the redirected light to escape from the other end of the optical grating. After exiting the optical grading, the light may impinge upon a detector, where it is detected. The detected light may then be used for various purposes, such as delivery of an encoded communications signal that was transmitted through the optical gratings. The optical gratings are integrated with semiconductor structures in order to convert a light signal to an electrical signal. Conventionally, the optical gratings are packaged at a same level as a logic device over a substrate, wherein a size of the packaged structure cannot be further reduced.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, dimensions of the various features may be arbitrarily increased or reduced for clarity of discussion.

DETAILED DESCRIPTION

Figure 1:
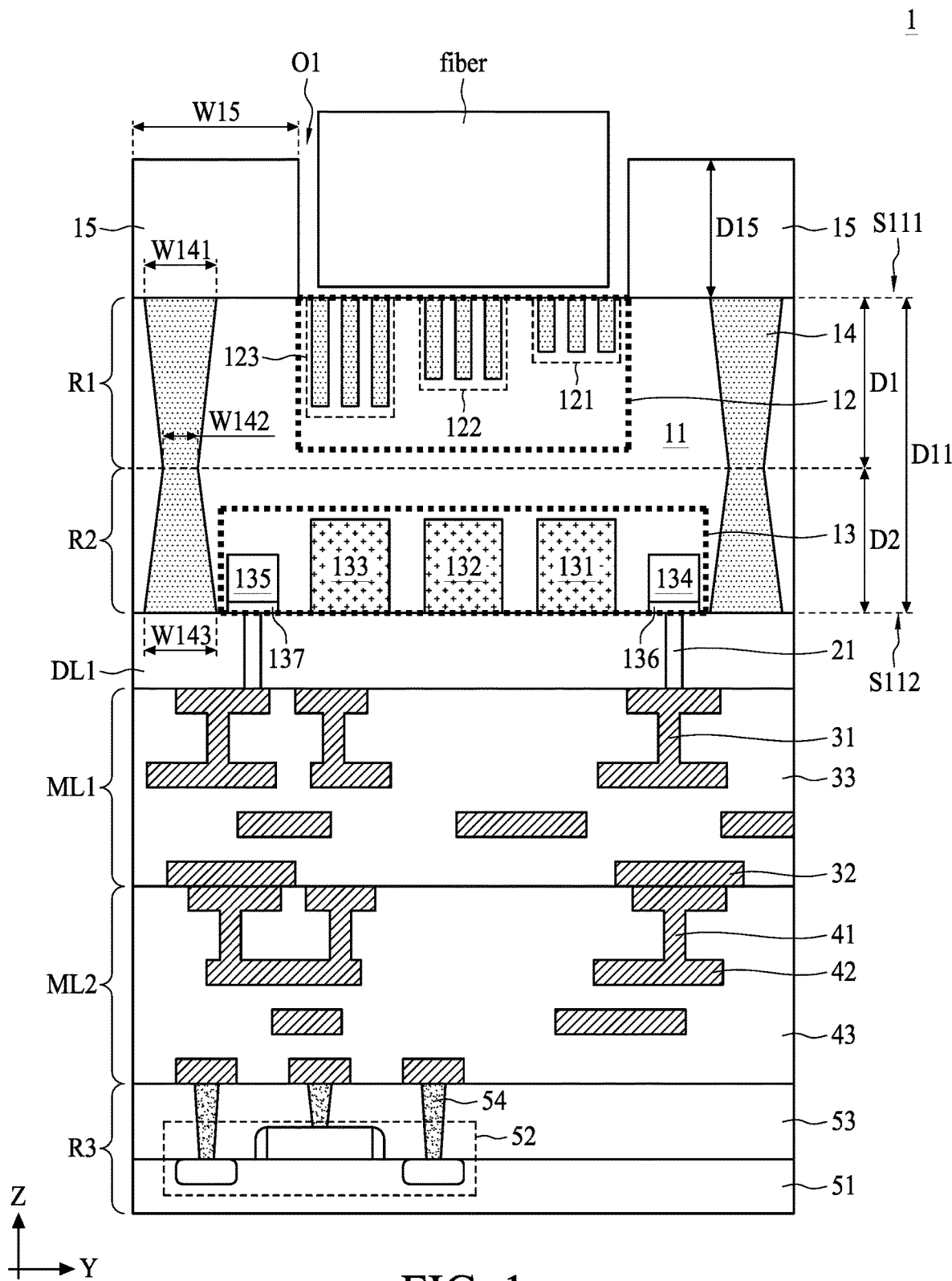
FIG. 1 is a schematic cross-sectional view of a photonic structure in accordance with some embodiments of the disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Referring to FIG. 1, a photonic structure 1 in accordance with some embodiments of the present disclosure is provided. The photonic structure 1 may include a guiding region R1, a sensing region R2, an dielectric layer DL1, a first interconnect structure ML1, a second interconnect structure ML2, and a logic region R3 stacked along a vertical direction or a Z direction. The guiding region R1 may receive optical signals, and the optical signals may be redirected to the sensing region R2. The sensing region R2 may detect the optical signals according to different ranges of wavelengths of the optical signals and then convert the optical signals to electrical signals. The electrical signals may then be transmitted to the logic region R3 through contacts 21 in the dielectric layer DL1, the first interconnect structure ML1 and the second interconnect structure ML2. In some embodiments, the photonic structure 1 can be adapted to wavelengths in a range of 20 nanometers (nm) to 200 micrometers (μm). In some embodiments, optical signals enter the guiding region R1 from a side of the guiding region R1, and the sensing region R2 is disposed on a side of the guiding region R1 opposite to the entrance of the optical signals. In such embodiments, the logic region R3 is disposed on a side of the sensing region R2 opposite to the guiding region R1 as shown in FIG. 1. Therefore, the optical signals and the electrical signals converted from the optical signals are transmitted within the photonic structure 1 along the vertical direction or the Z direction. In some embodiments, a thickness D1 of the guiding region R1 is in a range of 100 nm to 200 μm. In some embodiments, the thickness D1 of the guiding region R1 is in a range of 500 nm to 50 μm. In some embodiments, a thickness D2 of the sensing region R2 is in a range of 100 nm to 200 μm. In some embodiments, the thickness D2 of the sensing region R2 is in a range of 500 nm to 50 μm.

The guiding region R1 may include one or more guiding structures 12. In some embodiments, the guiding structures 12 can be referred to as grating structures 12. In some embodiments, one guiding structure 12 corresponds to one optical fiber. For a purpose of simplicity of the figures and ease of illustration, only one guiding structure 12 is depicted and illustrated in the present application. However, the invention is not limited thereto. The guiding structure 12 may detect optical signals with different ranges of wavelengths. In some embodiments, the guiding structure 12 includes a plurality of gratings. In some embodiments, the guiding structure 12 includes a first grating 121, a second grating 122 and a third grating 123. However, a number of the gratings is not limited herein. Each of the gratings (e.g., the first grating 121, the second grating 122 and the third grating 123) includes a plurality of trench isolations, and different pluralities of the trench isolations have different depths. In some embodiments, the trench isolations include dielectric materials. In some embodiments, the trench isolations include oxide, nitride, oxynitride, high-k dielectric materials, low-k dielectric materials or a combination thereof.

Figure 2:
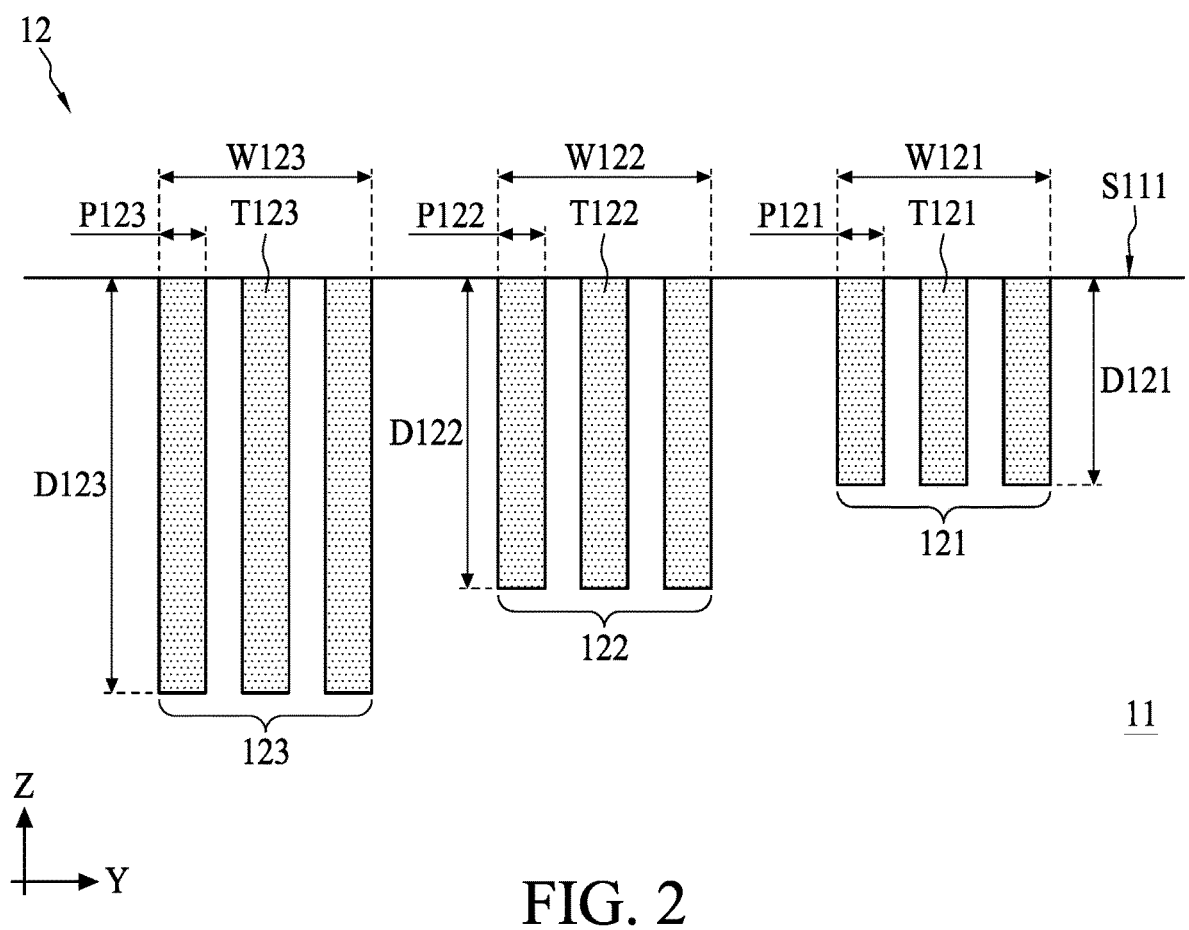
FIG. 2 is an enlarged schematic view of a guiding structure of the photonic structure shown in FIG. 1.

Referring to FIGS. 1 and 2, FIG. 2 shows an enlarged view of the guiding structure 12 of FIG. 1. In some embodiments, a first width W121 of the first grating 121, a second width W122 of the second grating 122, and a third width W123 of the third grating 123 are in a range of 10 nm to 200 μm. In some embodiments, the first width W121, the second width W122, and the third width W123 are in a range of 100 nm to 70 μm. In some embodiments, the first grating 121 includes a plurality of first trench isolations T121 having a first depth D121, the second grating 122 includes a plurality of second trench isolations T122 having a second depth D122, and the third grating 123 includes a plurality of third trench isolations T123 having a third depth D123. The trench isolations T121, T122 and T123 are disposed in a semiconductive layer 11 and extend from a first surface S111 of the semiconductive layer 11. In some embodiments, the first depth D121, the second depth D122 and the third depth D123 are measured from the first surface S111 toward an inside of the semi conductive layer 11. In some embodiments, the first depth D121, the second depth D122 and the third depth D123 are different from each other. The first depth D121, the second depth D122 and the third depth D123 are designed for detecting or reflecting different wavelengths of optical signals, and can be adjusted depending on different applications. In some embodiments, the first depth D121, the second depth D122 and the third depth D123 are in a range of 1 nm to 20 μm. In some embodiments, a first pitch (or a first width) P121 of one of the first trench isolations T121, a second pitch (or a second width) P122 of one of the second trench isolations T122, or a third pitch (or a third width) P123 of one of the third trench isolations T123 is in a range of 1 nm to 20 μm. In some embodiments, the pitches P121, P122 and P123 are measured at the first surface S111 along a first horizontal direction or a Y direction. In some embodiments, each of the gratings (e.g., 121, 122 and 123) may include 1 to 100,000 trench isolations (e.g., T121, T122 and T123). It should be noted that a number of the trench isolations in each of the gratings (e.g., 121, 122 and 123) can be adjusted for a purpose of total reflection of the optical signals. In some embodiments, the semiconductive layer 11 includes silicon. In some embodiments, the semiconductive layer 11 may be one of a silicon-on-insulator (SOI) substrate, a P-type substrate, an N-type substrate, and a sapphire substrate. In some embodiments, a thickness D11 of the semiconductive layer 11 is in a range of 100 nm to 200 μm.

Still referring to FIG. 1, the sensing region R2 may include a sensing device 13 vertically aligned with the guiding structure 12. The sensing device 13 may receive optical signals from the guiding structure 12 and convert the optical signals to electrical signals. In some embodiments, the sensing device 13 can be a photodetector. In some embodiments, the sensing device 13 is disposed in the semiconductive layer 11 and at a second surface S112 of the semiconductive layer 11, in which the second surface S112 is opposite to the first surface S111. In some embodiments, the sensing device 13 includes one or more semiconductive segments (e.g., 131, 132, and 133) and one or more doping regions (134 and 135). The semiconductive segments may be a light-absorption region, and the doping regions may electrically connect to the logic region R3 through the interconnect M1, the first interconnect structure MLA and the second interconnect structure ML2. The semiconductive segments may include a semiconductive material different from that of the semiconductive layer 11. In some embodiments, the semiconductive segments include germanium, silicon germanium ($Si_xGe_y$), elements from groups III and V in the periodic table, or a combination thereof. In some embodiments, the doping regions include an N-type doping region 134 and a P-type doping region 135. In some embodiments, the sensing device 13 further includes silicide layers 136 and 137 disposed on the doping regions 134 and 135, respectively, and at the second surface S112. The silicide layers 134 and 135 may include, for example, metal silicide such as cobalt silicide ($CoSi_x$), molybdenum silicide ($MoSi_x$), nickel silicide ($NiSi_x$), titanium silicide ($TiSi_x$), and/or other materials.

A number of the semiconductive segments (e.g., 131, 132 and 133) corresponds to a number of the gratings in the guiding region R1, and different semiconductive segments are designed to receive optical signals having different ranges of wavelengths filtered by the corresponding gratings. In some embodiments, each of the semiconductive segments has a width in a range of 10 nm to 200 μm measured along the Y direction. In some embodiments, each of the semiconductive segments has a thickness in a range of 10 nm to 200 μm measured along the Z direction. In some embodiments, the width is substantially less than the thickness of the semiconductive segment. In some embodiments, the semiconductive segments include a first segment 131, a second segment 132 and a third segment 133. In some embodiments, as shown in FIG. 1, the first segment 131 can receive optical signals from the first grating 121, the second segment 132 can receive optical signals from the second grating 122, and the third segment 133 can receive optical signals from the third grating 123.

As illustrated above, different depths (e.g., D121, D122 and D123) of different pluralities of trench isolations T121, T122 and T123) serve to filter different ranges of wavelengths. In some embodiments, a first optical signal is transmitted between the first trench isolations T121 of the first grating 121 and toward the first segment 131 of the sensing device 13. In some embodiments, a second optical signal is transmitted between the second trench isolations T122 of the second grating 122 and toward the second segment 132 of the sensing device 13. In some embodiments, a third optical signal is transmitted between the third trench isolations T123 of the third grating 123 and toward the third segment 133 of the sensing device 13. The first optical signal, the second optical signal and the third optical signal may have different wavelengths, and an individual optical signal of the optical signals is converted to an electrical signal through a corresponding semiconductive segment.

Figure 3A:
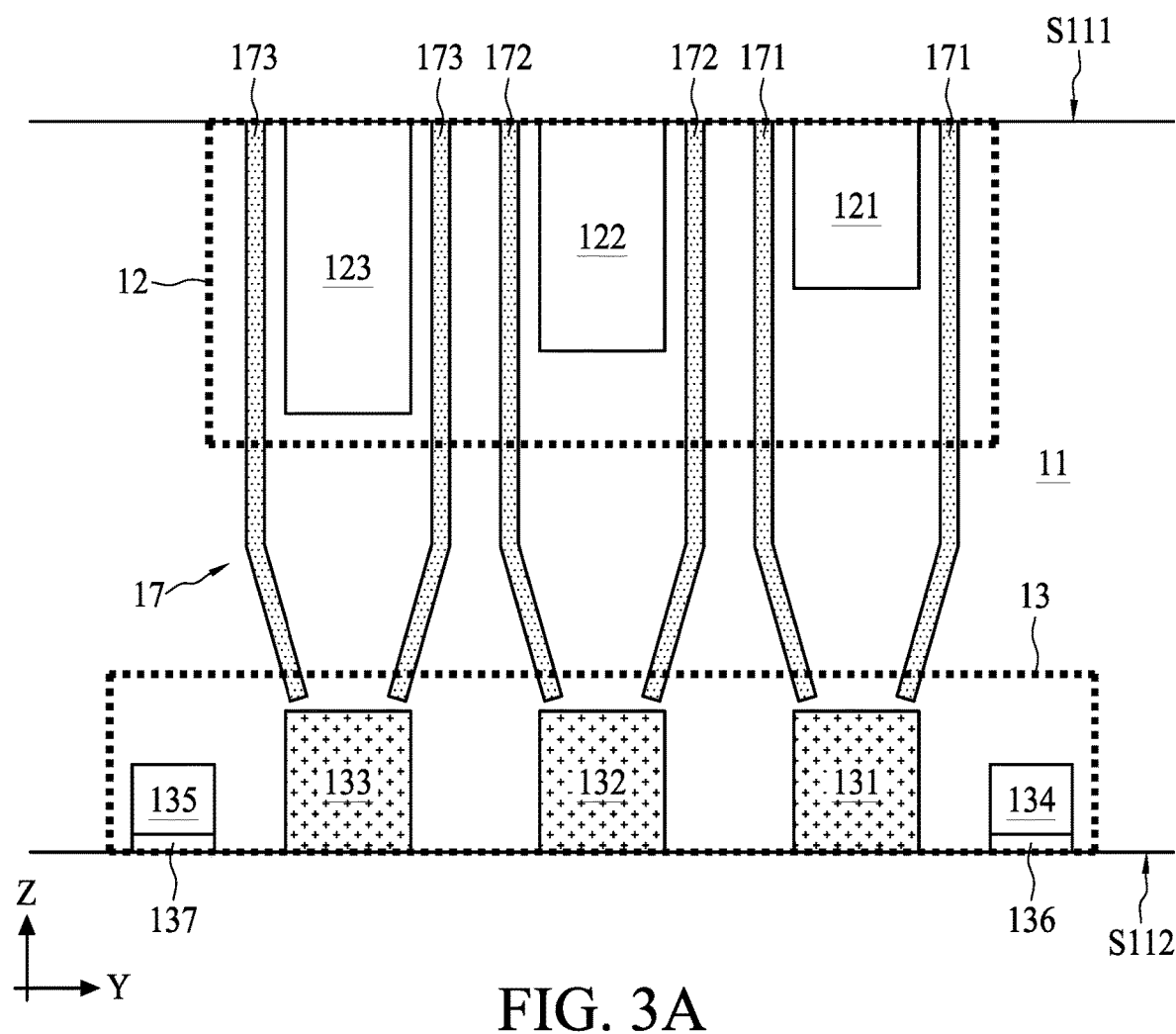
FIG. 3A to 3B are schematic cross-sectional views of a guiding region and a sensing region of a photonic structure in accordance with different embodiments of the disclosure.
Figure 3B:
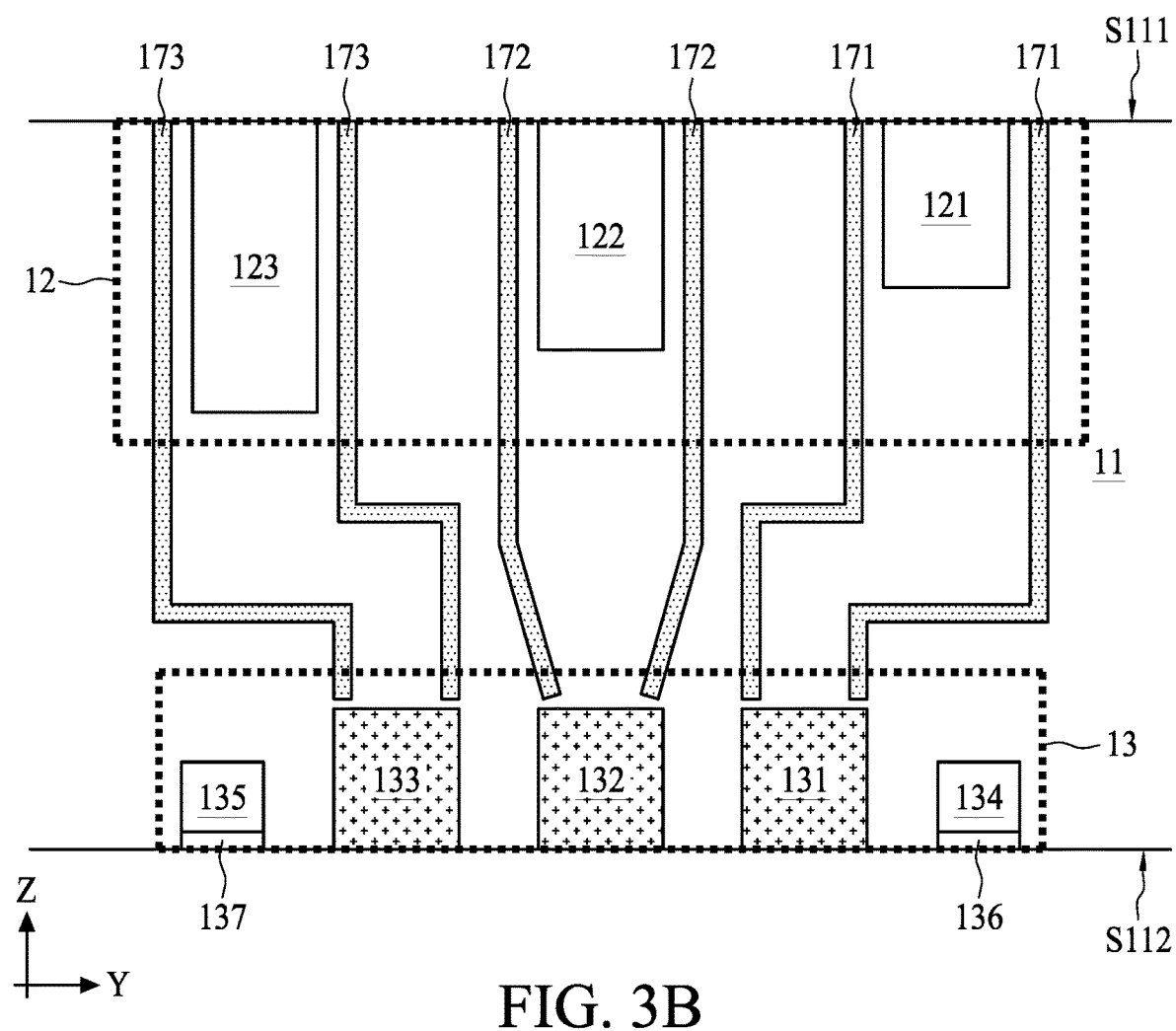

In some embodiments, the photonic structure 1 further includes one or more reflective structures 17. Referring to FIG. 1 and FIGS. 3A to 3B, FIG. 3A and FIG. 3B show one or more reflective structures 17 disposed in the semiconductive layer 11 to guide optical signals from the gratings to the semiconductive segments of the sensing device 13. In some embodiments, each of the reflective structures 17 surrounds one of the gratings. In some embodiments, the reflective structures 17 define a path or a route for optical signals from the guiding structure 12 to the sensing device 13. A number of the reflective structures 17 corresponds to a number of the gratings and/or a number of the semiconductive segments. In some embodiments, the one or more reflective structures 17 includes a first reflective structure 171, a second reflective structure 172 and a third reflective structure 173. In some embodiments, the first reflective structure 171 surrounds the first grating 121 and extends from the surface S111 toward the first segment 131. In some embodiments, the second reflective structure 172 surrounds the second grating 122 and extends from the surface S111 toward the second segment 132. In some embodiments, the third reflective structure 173 surrounds the third grating 123 and extends from the surface S111 toward the third segment 133. In some embodiments, the reflective structures 17 may include one or more dielectric materials. In some embodiments, the reflective structures 17 may include a same dielectric material as that of the trench isolations. In some embodiments, the reflective structures 17 may include oxide, nitride, high-k dielectric materials, low-k dielectric materials or a combination thereof. In some embodiments, the reflective structures 17 are disposed in the guiding region R1 and the sensing region R2. In some embodiments, the reflective structures 17 extend from the guiding region R1 and stop in the sensing region R2 at a top of the sensing device 13.

FIG. 3A and FIG. 3B are schematic enlarged cross-sectional views of the guiding region R1 and the sensing region R2 in accordance with different embodiments of the present disclosure. Referring to FIG. 3A, in some embodiments, each of the semiconductive segments 131, 132 and 133 of the sensing device 13 is vertically aligned with a corresponding one of the gratings 121, 122 and 123 of the guiding structure 12. In some embodiments, each of the reflective structures 171, 172 and 173 may be configured in a shape of a straight tube surrounding a corresponding one of the gratings 121, 122 and 123, and may extend toward a top of a corresponding one of the semiconductive segments 131, 132 and 133. In some embodiments, each of the reflective structures 171, 172 and 173 may be configured in a shape of a tapered tube surrounding the corresponding one of the gratings 121, 122 and 123 and may extend toward the top of the corresponding one of the semiconductive segments 131, 132 and 133 as shown in FIG. 3A. Referring to FIG. 3B, in some embodiments, at least one of the semiconductive segments 131, 132 and 133 is not vertically aligned with the corresponding grating 121, 122 and/or 123. In such embodiments, at least one of the reflective structures 171, 172 and 173 can be configured in a shape of a staggered tube surrounding the corresponding grating 121 or 123. In some embodiments, the first segment 131 is not vertically aligned with the first grating 121, and the reflective structure 171 is bent left and directed toward the first segment 131. In some embodiments, the third segment 131 is not vertically aligned with the third grating 123, and the reflective structure 173 is bent right and directed toward the third segment 133. FIG. 3A and FIG. 3B are exemplary embodiments for illustration a purpose of light redirection, and a configuration of the reflective structures is not limited herein.

Referring back to FIG. 1, the photonic structure 1 may include a through isolation 14 disposed in and penetrating the semiconductive layer 11. In some embodiments, the through isolation 14 surrounds the guiding structure 12 and the sensing device 13. In some embodiments, the through isolation 14 is for bonding of the guiding region R1 and the sensing region R2. In such embodiments, the through isolation 14 may or may not encircle the guiding structure 12 and the sensing device 13. In some embodiments, the through isolation 14 is for light reflection to prevent optical signals from entering the semiconductive layer 11 from outside the through isolation 14. In such embodiments, the through isolation 14 may encircle the guiding structure 12 and the sensing device 13. In some embodiments, the through isolation 14 includes one or more dielectric materials. In some embodiments, the through isolation 14 may include oxide, nitride, oxynitride, high-k dielectric materials, low-k dielectric materials or a combination thereof. In some embodiments, a top of the through isolation 14 is at the first surface S111 of the semiconductive layer 11, and a bottom of the through isolation 14 is at the second surface S112 of the semiconductive layer 11. In some embodiments, the through isolation 14 has a narrower middle portion, wherein the middle portion of the through isolation 14 is disposed between the guiding structure 12 and the sensing device 13. In some embodiments, the middle portion of the through isolation 14 is at an interface of the guiding region R1 and the sensing region R2. In some embodiments, a width of the through isolation 14 gradually decreases from the first surface S111 (or a top of the through isolation 14) toward a middle portion of the through isolation 14, and gradually increases from the middle portion toward the second surface S112 (or a bottom of the through isolation 14). In some embodiments, a top width W141 of the through isolation 14 measured at the first surface S111 is greater than a middle width W142 of the through isolation 14 measured at the interface of the guiding region R1 and the sensing region R2. In some embodiments, a bottom width W143 of the through isolation 14 measured at the second surface S112 is greater than the middle width W142 of the through isolation 14. In some embodiments, the top width W141 and the bottom width W143 are in a range of 10 nm to 100 µm. In some embodiments, the top width W141 and the bottom width W143 are substantially equal. In other embodiments, the top width W141 is substantially different from the bottom width W143. A shape of the through isolation 14 from a top view perspective is not limited herein.

Figure 4A:
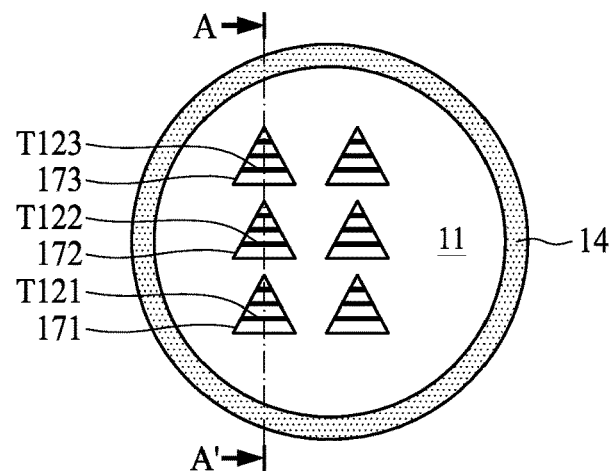
FIG. 4A to 4C are schematic top views of guiding regions of photonic structures in accordance with different embodiments of the disclosure.
Figure 4B:
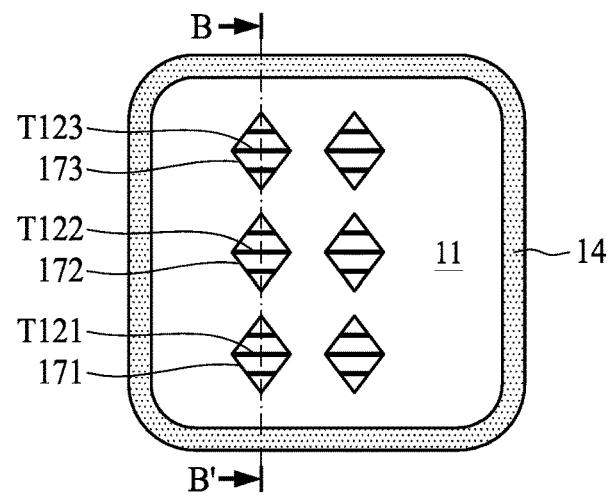
Figure 4C:
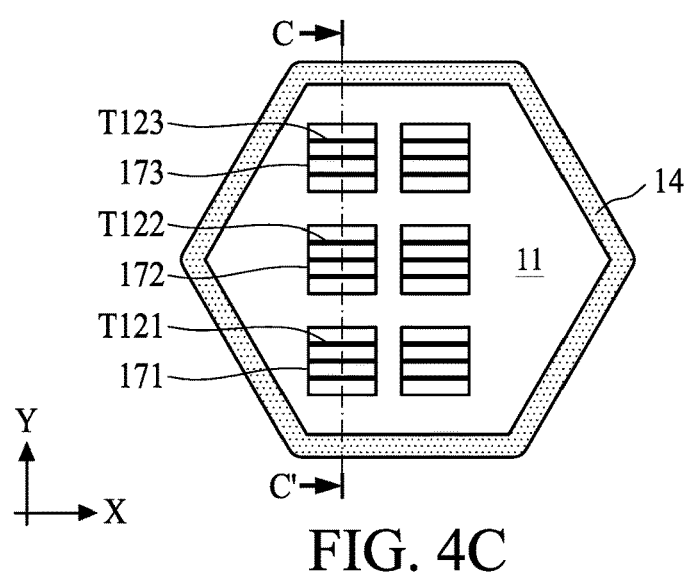

FIGS. 4A, 4B and 4C are top view perspectives of different through isolations 14 surrounding the guiding structure 12 and the reflective structures 17 in accordance with different embodiments of the present disclosure. Referring to FIG. 4A, in accordance with some embodiments, the through isolation 14 has a ring shape surrounding a plurality of rectangular reflective structures 17. In some embodiments, the plurality of trench isolations (e.g., T121, T122 and T123) are configured in a triangle, and a width of the plurality of trench isolations measured along a second horizontal direction or an X direction is gradually decreasing or increasing. In some embodiments, the through isolation 14 can be a circle or an ellipse from the top view perspective. In some embodiments, FIG. 1 is a cross-sectional view taken along a line A-A' in FIG. 4A. Referring to FIG. 4B, in accordance with some embodiments, the through isolation 14 has a rectangular shape surrounding a plurality of rhomboid reflective structures 17. In some embodiments, the plurality of trench isolations (e.g., T121, T122 and T123) are configured in a rhombus, and a width of each of the plurality of trench isolations measured along the second horizontal direction or the X direction corresponds to the rhomboid reflective structures 17. In some embodiments, the width of the plurality of trench isolations increases and then decreases along the first horizontal direction or the Y direction. In some embodiments, the through isolation 14 is rectangular with rounded corners, as shown in FIG. 4B. In some embodiments, the rectangular through isolation 14 has right corners. In some embodiments, the rectangular through isolation 14 is a square. In some embodiments, FIG. 1 is a cross-sectional view taken along a line B-B' in FIG. 4B. Referring to FIG. 4C, in accordance with some embodiments, the through isolation 14 has a hexagonal shape surrounding a plurality of rectangular reflective structures 17. In some embodiments, the plurality of trench isolations (e.g., T121, T122 and T123) are configured in a rectangle or a square, and a width of the plurality of trench isolations measured along the second horizontal direction or the X direction stays constant along the second horizontal direction or the Y direction. In some embodiments, FIG. 1 is a cross-sectional view taken along a line C-C' in FIG. 4C. FIGS. 4A, 4B and 4C are exemplary embodiments showing different configurations of the through isolation 14, the reflective structures 17 and the plurality of trench isolations, but the present disclosure is not limited thereto. Different combinations of different configurations of the through isolation 14, the reflective structures 17 and the plurality of trench isolations can be provided according to the concept of the present disclosure.

Referring back to FIG. 1, the dielectric layer DL1 is disposed on a side of the sensing region R2 opposite to the guiding region R1. In some embodiments, the dielectric layer DL1 is disposed on the second surface S112 of the semiconductive layer 11. One or more contacts 21 may be disposed in the dielectric layer DL1. In some embodiments, the one or more contacts 21 are surrounded by the dielectric layer DL1. In some embodiments, the one or more contacts 21 penetrate the dielectric layer DL1. The one or more contacts 21 provide one or more electrical paths. The dielectric layer DL1 can provide electrical insulation between different electrical paths. In some embodiments, the doping regions 134 and 135 are electrically connected to different contacts 21. Electrical signals from the doping regions 134 and 135 are transmitted to the logic region R3 through the contacts 21 of the dielectric layer DL1. In some embodiments, the dielectric layer 23 may be an interlayer dielectric layer. In some embodiments, the contacts 21 may include tungsten.

The first interconnect structure ML1 is disposed on a side of the dielectric layer DL1 opposite to the sensing region R2. In some embodiments, the first interconnect structure ML1 is disposed between the dielectric layer DL1 and the second interconnect structure ML2. The first interconnect structure ML1 may include a plurality of dielectric layers 33 and a plurality of conductive layers. In some embodiments, the plurality of conductive layers are disposed in and surrounded by the plurality of dielectric layers 33. In some embodiments, the plurality of conductive layers includes one or more layers of conductive vias 31 and one or more layers of conductive parts 32. Different layers of the conductive vias 31 and the conductive parts 32 are electrically connected in order to provide one or more electrical paths. The dielectric layers 33 can provide electrical insulation between different electrical paths. In some embodiments, the contacts 21 are electrically connected to different conductive parts 32 at a topmost layer of the first interconnect structure ML1. In some embodiments, the contacts 21 are in physical contact with the conductive parts 32. Electrical signals from the contact 21 in the dielectric layer DL1 are then transmitted to the logic region R3 through the first interconnect structure ML1. In some embodiments, the conductive vias 31 and the conductive parts 32 may include a same conductive material. In some embodiments, the conductive vias 31 and/or the conductive parts 32 may include copper.

The second interconnect structure ML2 is disposed on a side of the first interconnect structure ML1 opposite to the dielectric layer DL1. In some embodiments, the second interconnect structure ML2 is disposed between the first interconnect structure ML1 and the logic region R3. The second interconnect structure ML2 may include a plurality of dielectric layers 43 and a plurality of conductive layers. In some embodiments, the plurality of conductive layers are disposed in and surrounded by the plurality of dielectric layers 43. In some embodiments, the plurality of conductive layers includes one or more layers of conductive vias 41 and one or more layers of conductive parts 42. Different layers of the conductive vias 41 and the conductive parts 42 are electrically connected in order to provide one or more electrical paths. The dielectric layers 43 can provide electrical insulation between different electrical paths. In some embodiments, the conductive parts 32 at a bottommost layer of the first interconnect structure ML1 facing the second interconnect structure ML2 are electrically connected to different conductive parts 42 at a topmost layer of the second interconnect structure ML2. In some embodiments, the conductive parts 32 are in physical contact with the conductive parts 42. Electrical signals from the first interconnect structure ML1 are transmitted to the logic region R3 through the second interconnect structure ML2. In some embodiments, the conductive vias 41 and the conductive parts 42 may include a same conductive material. In some embodiments, the conductive vias 41 and/or the conductive parts 42 may include copper.

The logic region R3 is disposed on a side of the second interconnect structure ML2 opposite to the first interconnect structure ML1. In some embodiments, the logic region R3 may include one or more of active devices. In some embodiments, the active device may include one or more of a programmable logic device, a SRAM device, a DRAM device and a field programmable gate array. In some embodiments, the logic region R3 may include a substrate 51, a plurality of transistors 52, an insulating layer 53, and a plurality of contacts 54. For a purpose of simplicity, only one transistor 52 is depicted in FIG. 1, but the disclosure is not limited thereto. In some embodiments, the transistors 52 are formed in the substrate 51, and the insulating layer 53 is formed on the substrate 51 covering the transistors 52. In some embodiments, the insulating layer 53 may be an interlayer dielectric layer. In some embodiments, the contacts 54 are formed in the insulating layer 53 and electrically connect to source regions, drain regions and gate structures of the transistors 53. In some embodiments, the contacts 54 may include tungsten. In some embodiments, the contacts 54 may include copper. A material of the contacts 54 depends on different applications or device generations. The first and second interconnect structures ML1 and ML2 provide electrical connections between the sensing region R2 and the logic region R3.

Still referring to FIG. 1, the photonic structure 1 may further include a supporting structure 15 disposed at the first side of the guiding region R1. In some embodiments, the supporting structure 15 is disposed at the first surface S111 of the semiconductive layer 11. In some embodiments, a thickness of the supporting structure 15 measured along the Z direction is in a range of 100 nm to 2000 μm. In some embodiments, the supporting structure 15 includes an opening O1 disposed vertically over the guiding structure 12 of the guiding region R1. In some embodiments, the opening O1 exposes the guiding structure 12. In some embodiments, the opening O1 reserves a space for an optical fiber, and the supporting structure 15 supports the disposition of the optical fiber. In some embodiments, the optical fiber is disposed in the opening O1, and optical signals traveled in the optical fiber pass through the first surface S111 of the semiconductive layer 11 and enters the guiding structure 12. In some embodiments, the supporting structure 15 is disposed vertically over portions of the semiconductive layer 12 outside the guiding structure 12. In some embodiments, the supporting structure 15 includes one or more of dielectric materials, ceramic materials, silica-based ceramic materials, such as silicon dioxide ($SiO_2$), hafnium silicate ($HfSiO_4$), and zirconium silicate ($ZrSiO_4$), low-k dielectric materials, nitride-containing dielectric materials, and other suitable materials. In some embodiments, a configuration of the opening O1 from a top view perspective depends on a cross section of an optical fiber to be disposed. In some embodiment, a configuration of the opening O1 from the top view perspective can be a triangle, a circle, a square, and so forth.

Figure 5:
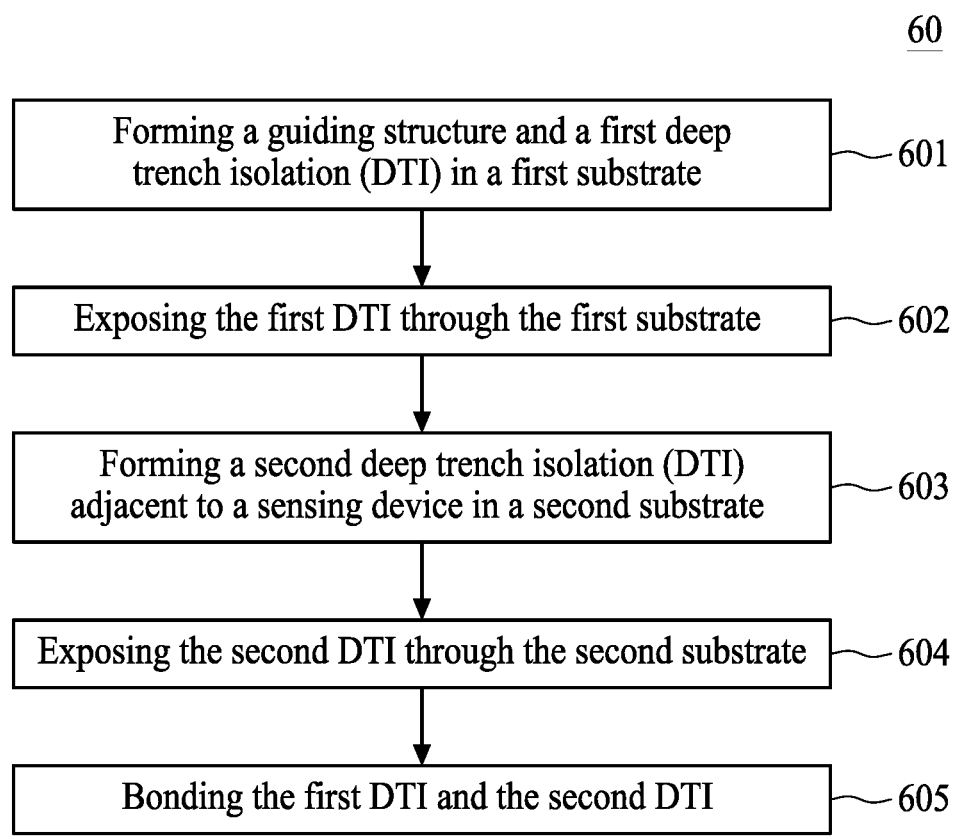
FIG. 5 is flow diagram of a method for manufacturing a photonic structure in accordance with some embodiments of the disclosure.

FIG. 5 shows a flowchart representing a method 60 for forming a photonic structure 2 in accordance with some embodiments of the disclosure. The photonic structure 1 may be similar to the photonic structure 1. The method 60 may include several operations: (601) forming a guiding structure and a first deep trench isolation (DTI) in a first substrate; (602) exposing the first DTI through the first substrate; (603) forming a second deep trench isolation (DTI) adjacent to a sensing device in a second substrate; (604) exposing the second DTI through the second substrate; and (605) bonding the first DTI and the second DTI. The method 60 will be further described according to one or more embodiments. It should be noted that the operations of the method 60 may be rearranged or otherwise modified within the scope of the various aspects of the present disclosure. It should be further noted that additional processes may be provided before, during, and after the method 60, and that some other processes may be only briefly described herein. Thus, other implementations are possible within the scope of the various aspects described herein.

In order to further illustrate concepts of the present disclosure, various embodiments are provided below. For a purpose of clarity and simplicity, reference numbers of elements with same or similar functions are repeatedly used in different embodiments. However, such usage is not intended to limit the present disclosure to specific embodiments or specific elements. In addition, conditions or parameters illustrated in different embodiments can be combined or modified to have different combinations of embodiments as long as the parameters or conditions used are not conflicted.

Figure 6:
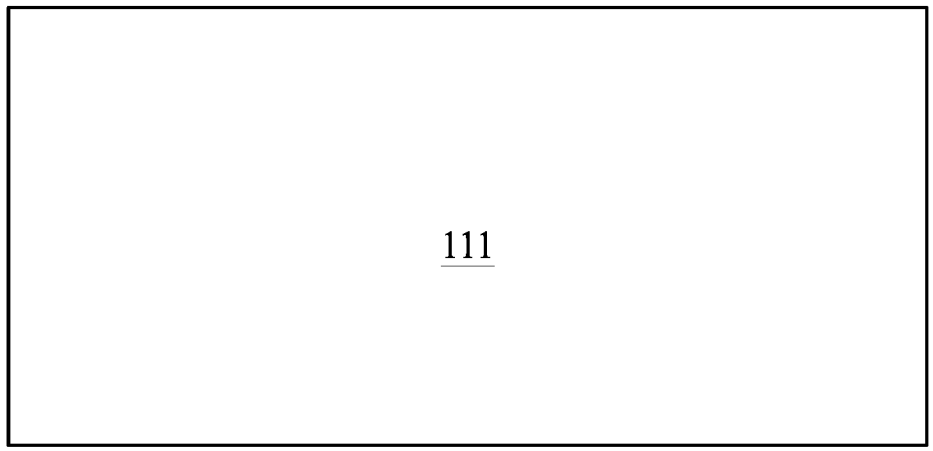
FIGS. 6 to 21 are schematic cross-sectional views at different manufacturing stages according to the method for manufacturing a photonic structure in accordance with some embodiments of the disclosure.
Figure 7:
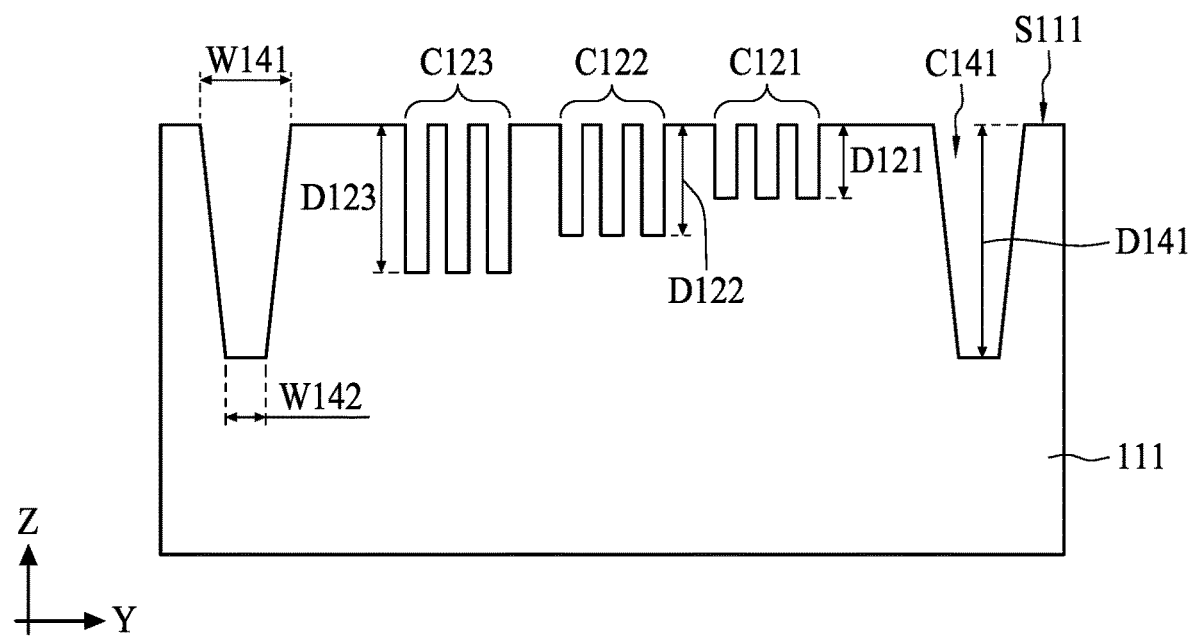

Please refer to FIGS. 6 to 9, which are schematic drawings of a first wafer WF1 in various stages according to aspects of the present disclosure in one or more embodiments. In the operation 601, a first substrate 111 is provided as shown in FIG. 6, and a plurality of trench isolations having different widths and depths are formed therein. In some embodiments, the first substrate 111 is a silicon wafer. In some embodiments, the first substrate 111 includes a semiconductive material. In some embodiments, the first substrate 111 is a silicon substrate. In some embodiments, the silicon substrate can include polysilicon or single crystalline silicon. In some embodiments, the first substrate 111 can be one of a polysilicon substrate, a single crystalline silicon substrate, a gullium arsenide (GaAs) substrate, a silicon-on-insulator (SOI) substrate, a P-type substrate, an N-type substrate, and a sapphire substrate. Portions of the first substrate 111 are removed to form a plurality of trenches in the first substrate 111 as shown in FIG. 7. In some embodiments, the trenches includes a plurality of first trenches C121, a plurality of second trenches C122, a plurality of third trenches C123, and one or more deep trenches C141. In some embodiments, the first trenches C121, the second trenches C122, and the third trenches C123 are all straight trenches with constant widths along the vertical direction or the Z direction. In some embodiments, a depth D141 of the deep trench C141 is substantially greater than a depth D121 of the first trenches C121, a depth D122 of the second trenches C122, and a depth D123 of the third trenches C123. In some embodiments, the deep trench C141 is tapered from a first surface S111 of the substrate 111 toward an inside of the substrate 111. In some embodiments, a width W142 measured at a bottom of the deep trench C141 is less than a top width W141 measured at a top of the deep trench C141. In other embodiments, the deep trench C141 is a straight trench and has a constant width along the vertical direction, and the width W142 is substantially equal to the top width W141. In order to provide stronger bonding in subsequence processes, the width W142 may be substantially greater than a width of any of the first trenches C121, the second trenches C122 and the third trenches C123.

Profiles of the first trenches C121, the second trenches C122, the third trenches C123 and the deep trench C141 shown in FIG. 6 are exemplary examples for a purpose of illustration. Profiles of the trenches (e.g., C121, C122, C123, and C141) are not limited herein. In some embodiments, one or more operations can be performed to form trenches having different profiles. In some embodiments, formation of the trenches can include performing a vertical dry etch, a directional dry etch, an isotropic wet etch, an anisotropic wet etch, a patterning operation, or a combination thereof to provide any of various profiles of the trenches.

Figure 22A:
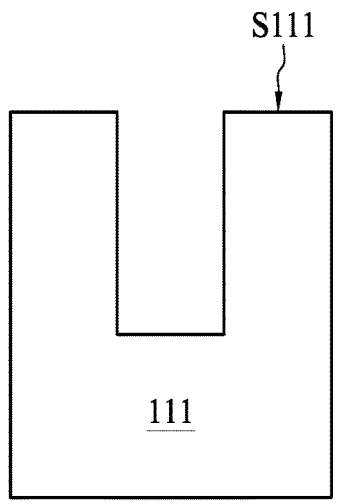
FIG. 22A to 22E are schematic cross-sectional views trenches of a photonic structure in accordance with different embodiments of the disclosure.
Figure 22B:
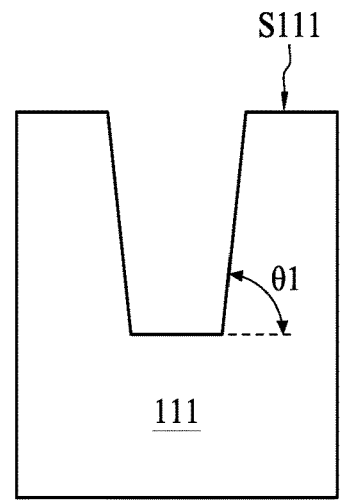
Figure 22C:
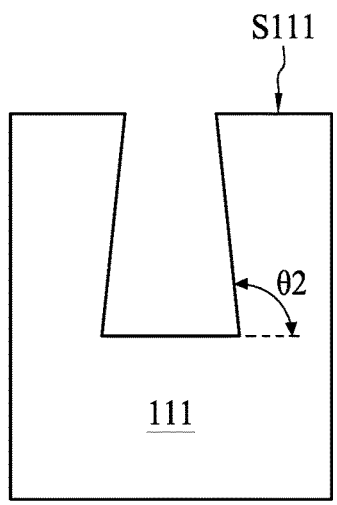
Figure 22D:
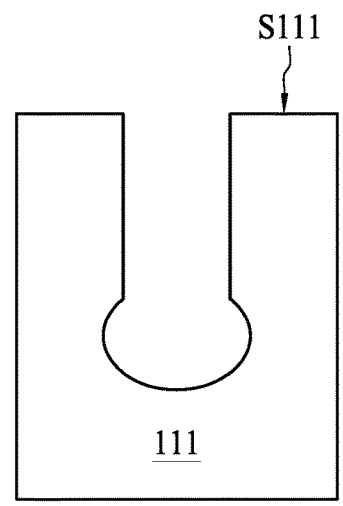
Figure 22E:
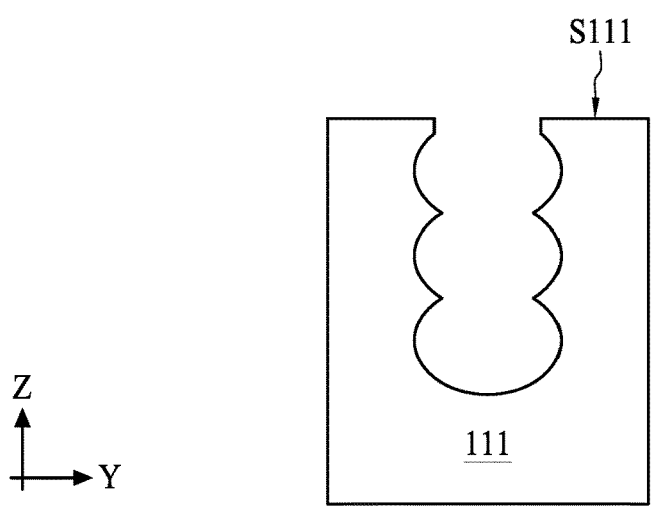

Please refer to FIG. 7 and FIGS. 22A to 22E, which shows different profiles of trenches according to different embodiments of the present disclosure. The trenches formed during the operation 601 can be similar to one or more of trenches as shown in FIGS. 22A to 22E. In some embodiments, at least one of the trenches in FIG. 7 has a profile as shown in FIG. 22A. In some embodiments, a vertical dry etch is performed to form a trench having a constant width along the vertical direction or the Z direction. In some embodiments, at least one of the trenches in FIG. 7 has a profile as shown in FIG. 22B. In some embodiments, a directional dry etch is performed, and a tapered trench from a first surface S111 of the substrate 111 is formed. In some embodiments, a vertical dry etch is performed, and the tapered trench from the first surface S111 is formed due to a lower removal rate of the dry etch at a bottom of the trench. In some embodiments, an elevation angle θ1 of a sidewall of the trench is in a range of 70 to 90 degrees. In some embodiments, at least one of the trenches in FIG. 7 has a profile as shown in FIG. 22C. In some embodiments, a directional dry etch is performed, and a tapered trench toward the first surface S111 is formed. In some embodiments, an elevation angle θ2 of a sidewall of the trench is in a range of 90 to 120 degrees. In some embodiments, at least one of the trenches in FIG. 7 has a profile as shown in FIG. 22D. In some embodiments, a vertical dry etch and an isotropic wet etch are performed, and a trench having a wider and rounded bottom is formed. In some embodiments, at least one of the trenches in FIG. 7 has a profile as shown in FIG. 22E. In some embodiments, multiple isotropic wet etches are performed, and a trench having a shape of an "8" or a shape of connected circles is formed.

Figure 8:
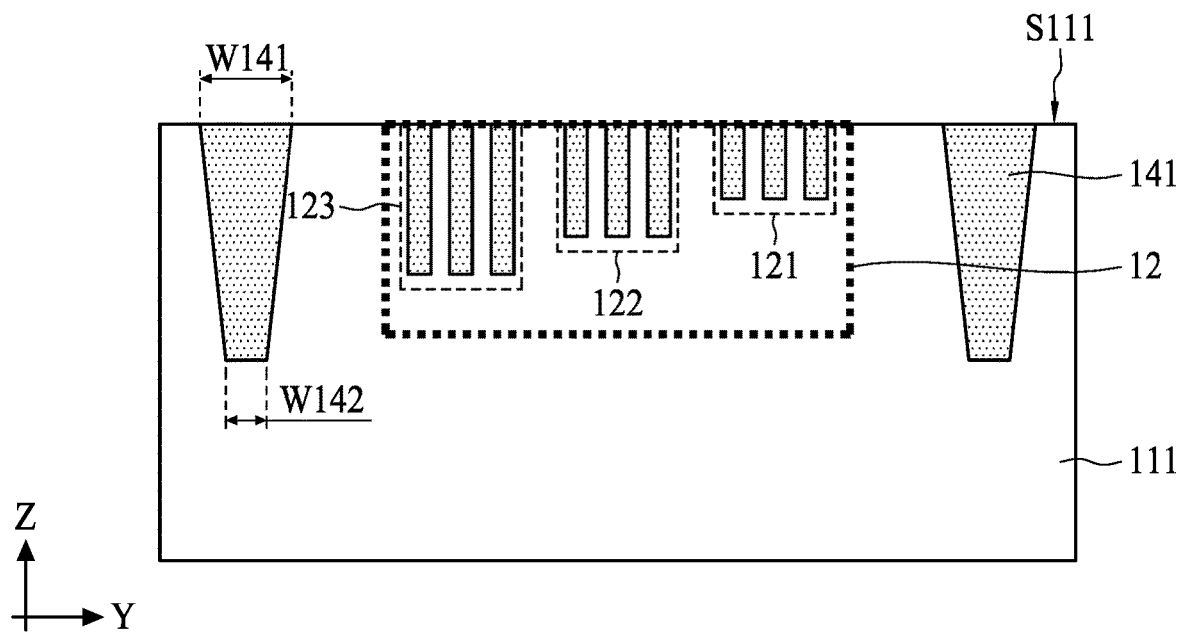
Figure 9:
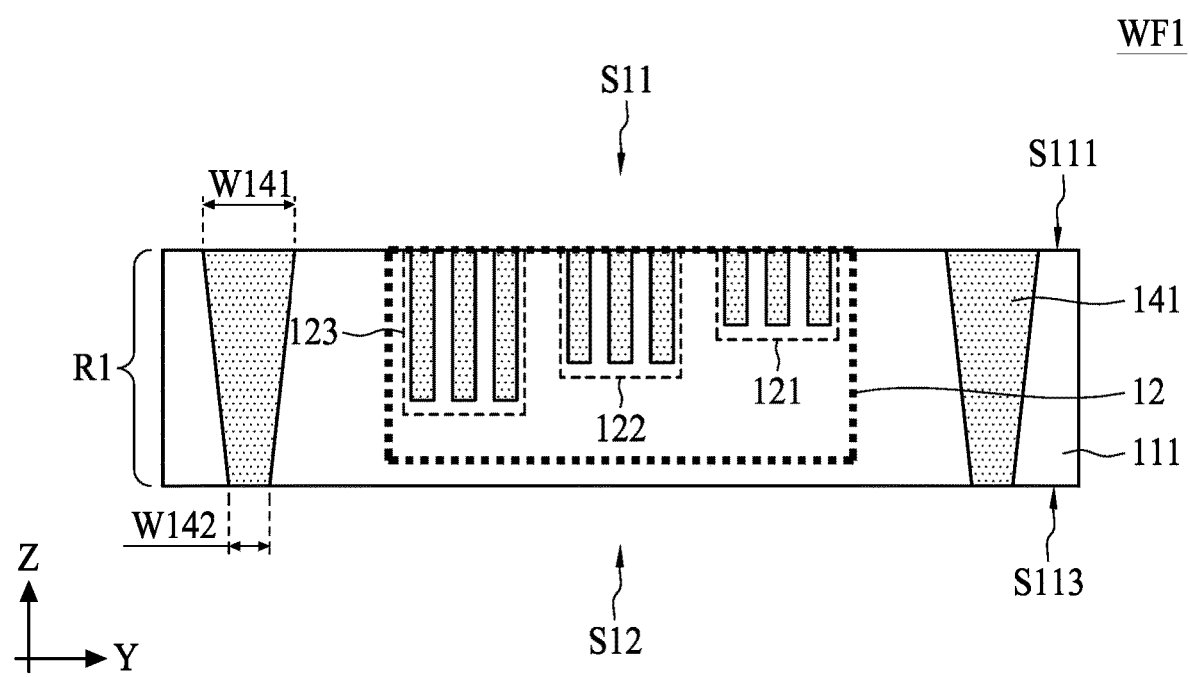
Figure 10:
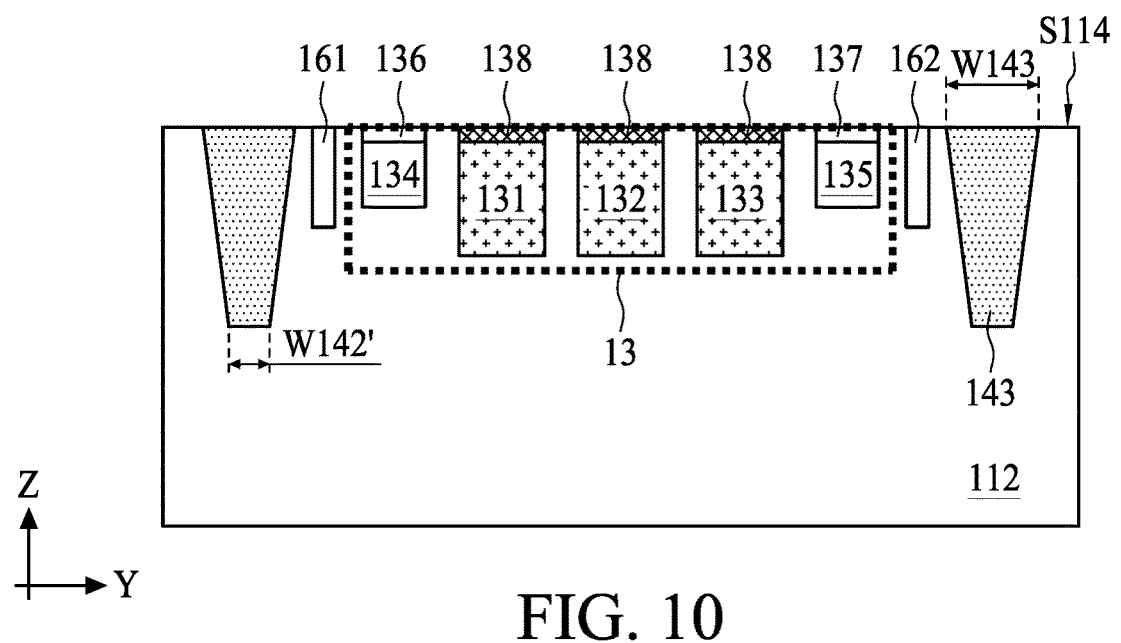

Referring back to FIGS. 8 to 9, a dielectric material is formed over the first substrate 111 and fills the trenches C121, C122, C123 and C141 to form a guiding structure 12 and a first deep trench isolation (DTI) 141 in the first substrate 111. In some embodiments, one or more operations can be performed to form the guiding structure 12 and the first DTI 141. In some embodiments, the one or more operations may include an atomic layer deposition (ALD), a chemical vapor deposition (CVD), a chemical mechanical polishing (CMP), and/or other suitable techniques. In the operation 602, a portion of the substrate 111 is removed to expose a bottom of the first DTI 141. In some embodiments, a planarization is performed on a surface of the substrate 111 opposite to the first surface S111 as shown in FIG. 8. In some embodiments, the planarization includes a CMP operation. In some embodiments, the CMP operation stops at an exposure of the bottom of the first DTI 141. The first wafer WF1 is thereby provided as shown in FIG. 9. In some embodiments, the first wafer WF1 defines the guiding region R1. In some embodiments, optical signals are designed to enter the guiding region R1 from a first side S11 and transmitted to a sensing region R2 to be disposed on a second side S12 of the guiding region R1, in which the second side S12 is opposite to the first side S11.

Please refer to FIGS. 10 to 13, which are schematic drawings of a second wafer WF2 in various stages according to aspects of the present disclosure in one or more embodiments. In the operation 603, a second DTI 143 is formed adjacent to a sensing device 13 in a second substrate 112. In some embodiments, the sensing device 13 is formed from a first surface S114 of the second substrate 112. In some embodiments, the second DTI 143 is formed from the first surface S114 of the second substrate 112. In some embodiments, the second substrate 112 can be similar to or same as the first substrate 111. In some embodiments, the second substrate 112 can be one of a semiconductor substrate, a polysilicon substrate, a single crystalline silicon substrate, a gullium arsenide (GaAs) substrate, a silicon-on-insulator (SOI) substrate, a P-type substrate, an N-type substrate, and a sapphire substrate. The sensing device 113 can be formed by a conventional method of forming a semiconductor or a photonic detector, and detailed description is omitted herein. Formation of the second DTI 143 can be similar to the formation of the first DTI 141 as illustrated above, and repeated description is omitted herein. In some embodiments, a width W142' measured at a bottom of the second DTI 143 is substantially equal to the width W142 measured at a bottom of the first DTI 141. In some embodiments, the photonic structure 2 further includes a plurality of isolations between the sensing device 13 and the second DTI 143. In some embodiments, the plurality of isolations include a first isolation 161 adjacent to an N-type doping region 134 and a second isolation 162 adjacent to a P-type doping region 135 of the sensing device 13. In some embodiments, the plurality of isolations are for a purpose of dopant isolation. In some embodiments, the plurality of isolations can prevent diffusion of N-type dopant or P-type dopant outside the sensing device 13. In some embodiments, the plurality of isolations (e.g., 161 and 162) are shallow trench isolations (STI). In some embodiments, the sensing device 13 further includes a plurality of cover films 138 disposed at the first surface S114 of the second substrate 112. In some embodiments, each of the cover films 138 is disposed on one of a plurality of semiconductive segments (e.g., 131, 132 and 133). In some embodiments, the cover films 138 include oxide, nitride, oxynitride, or a combination thereof. In some embodiments, the cover films 138 may include silicon oxide ($SiO_x$), silicon oxynitride ($SiO_xN_y$), titanium dioxide ($TiO_2$), silicon nitride (SiN) or a combination thereof. In some embodiments, the cover films 138 are formed after the semiconductive segments (e.g., 131, 132 and 133). In some embodiments, the cover films 138 are formed only on the semiconductive segments (e.g., 131, 132 and 133). In some embodiments, a refraction index of the cover films 138 is different from a refraction index of the semiconductive segments (e.g. 131, 132 and 133). In some embodiments, silicide layers 136 and 137 are formed after the doping regions 134 and 135. In some embodiments, the silicide layers 136 and 137 are formed only on the doping regions 134 and 135.

Figure 11:
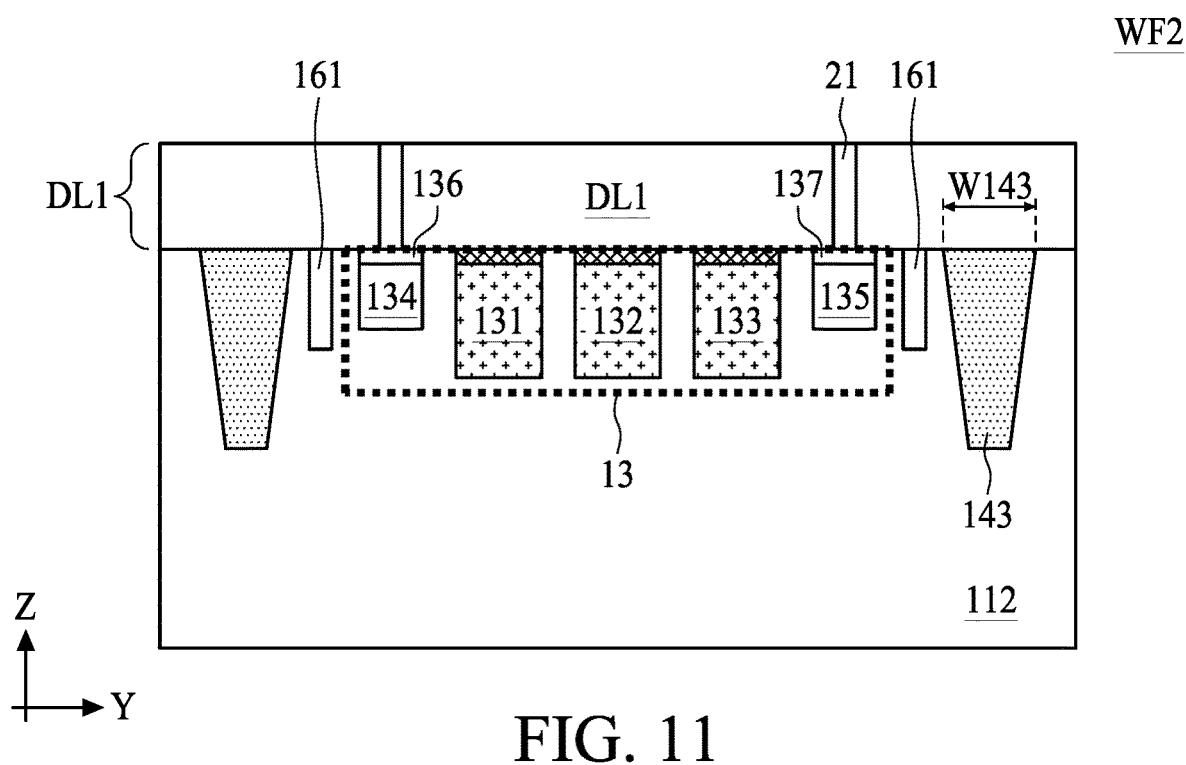
Figure 12:
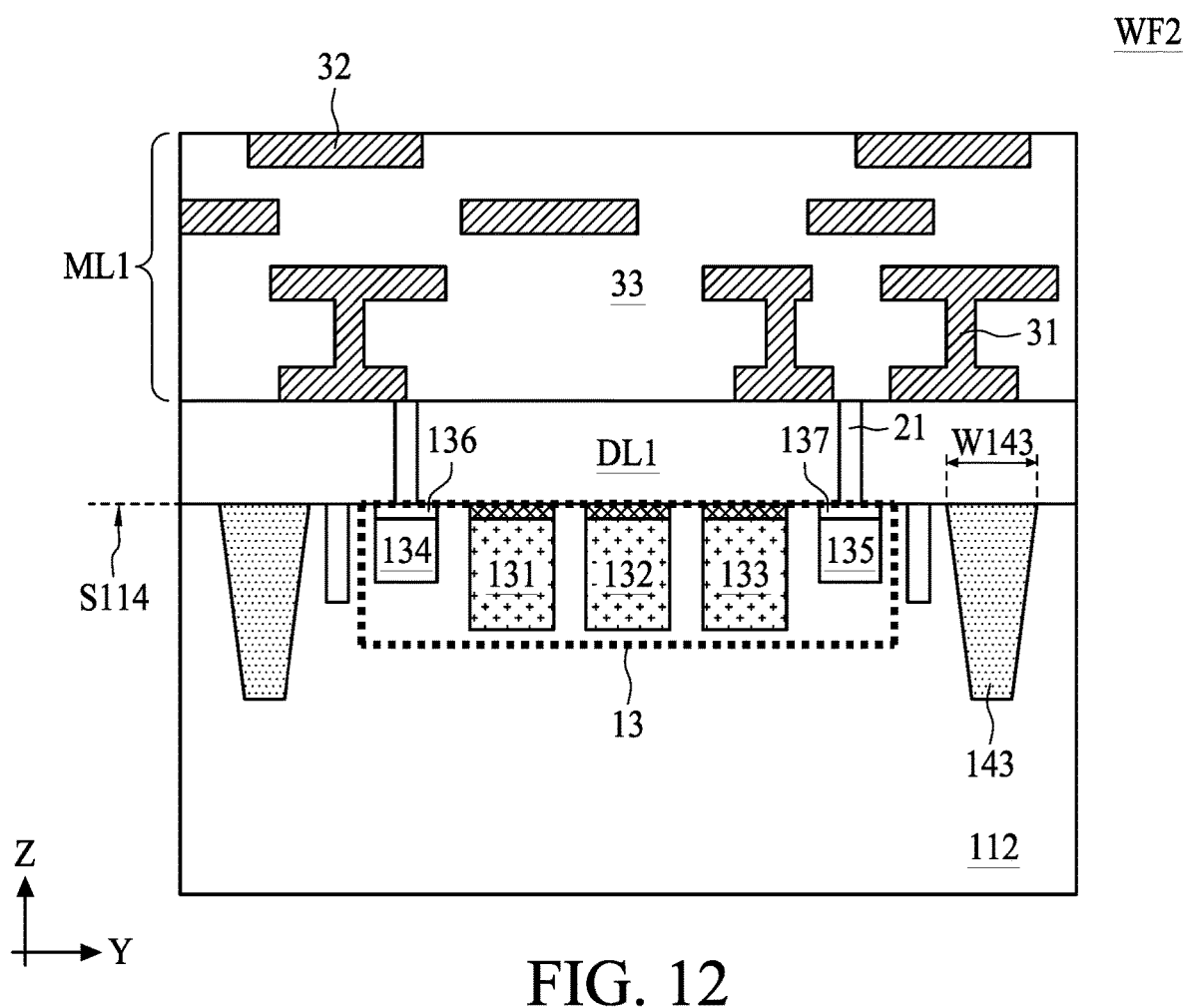

Referring to FIGS. 11 to 12, an dielectric layer DL1 and a first interconnect structure ML1 are sequentially formed on the first surface S114 of the second substrate 112. In some embodiments, the dielectric layer DL1 is formed by a deposition. In some embodiments, the dielectric layer DL1 is an interlayer dielectric layer. In some embodiments, portions of the dielectric layer DL1 are removed, and a conductive material is deposited in the space of the removed portions of the dielectric layer DL1 to form one or more contacts 21. In some embodiments, the contacts 21 electrically connect to the doping regions 134 and 135 through the silicide layers 136 and 137. The first interconnect structure ML1 is formed on the dielectric layer DL1 and electrically connects to the doping regions 134 and 135. In some embodiments, formation of dielectric layers and formation of patterned conductive layers are alternatively performed to form the first interconnect structure ML1. In some embodiments, the patterned conductive layers define a plurality of conductive parts 32 and a plurality of conductive vias 31. The conductive parts 32 and the conductive vias 31 together form electrical paths of the first interconnect structure ML1 to transmit electrical signals from a sensing device 13.

Figure 13:
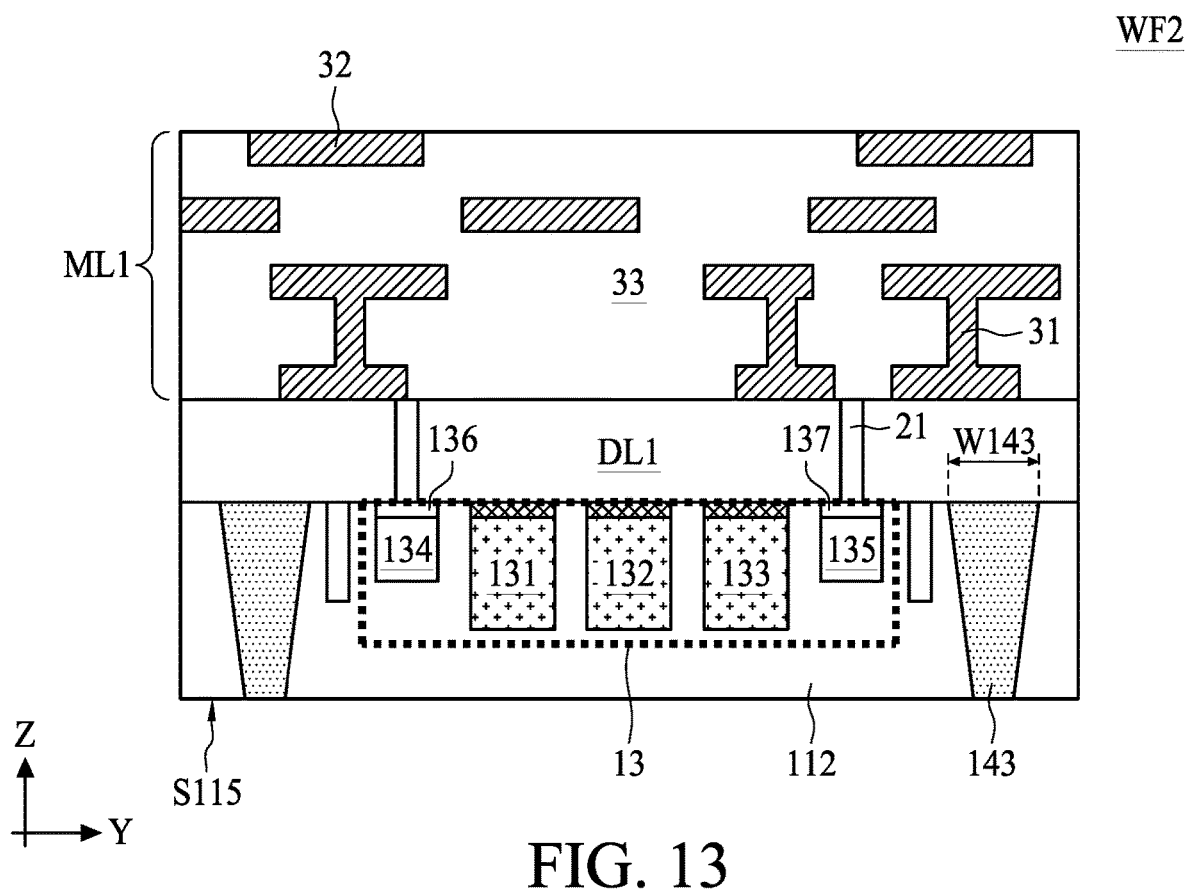

Referring to FIG. 13, in the operation 604, a portion of the substrate 112 is removed to expose a bottom of the second DTI 143. In some embodiments, a planarization is performed on a surface of the substrate 112 opposite to the first surface S114 as shown in FIG. 12. In some embodiments, the planarization includes a CMP operation. In some embodiments, the CMP operation stops at an exposure of the bottom of the second DTI 143. The second wafer WF2 is thereby provided as shown in FIG. 13. In some embodiments, a configuration of the bottom of the second DTI 143 exposed through a bottom of the second substrate S112 corresponds to a configuration of a bottom of the first DTI 141 exposed through the first substrate S111, and therefore, the first DTI 141 and the second DTI 143 can be bonded to form a through isolation 14 in subsequent processing.

Figure 14:
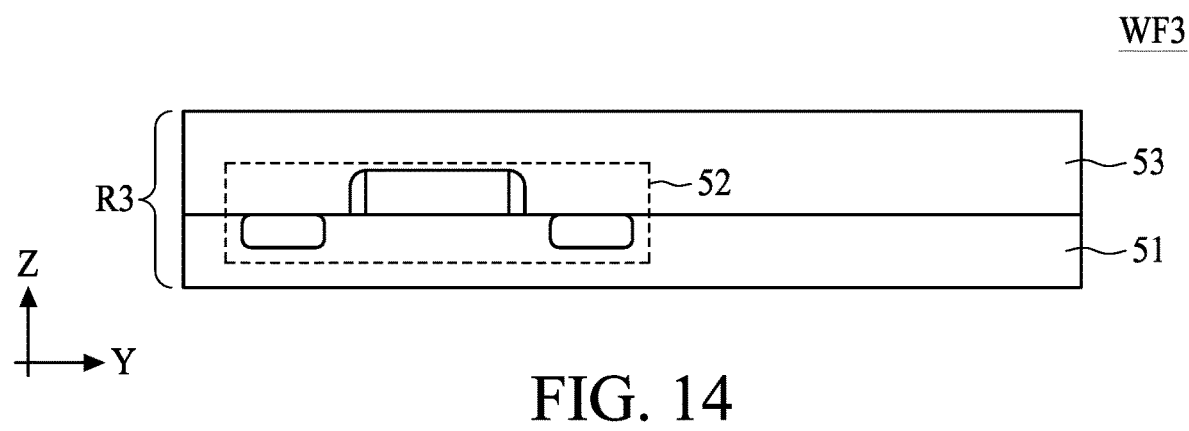
Figure 15:
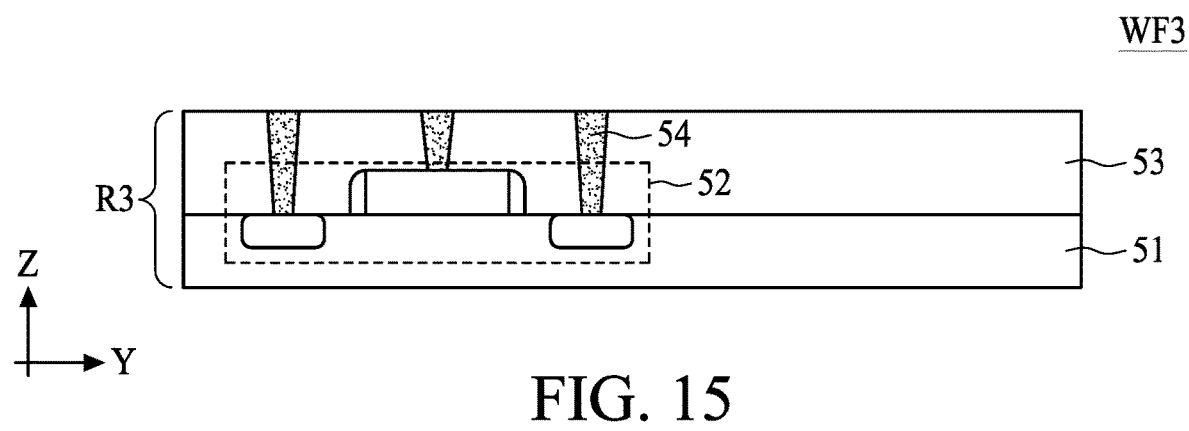
Figure 16:
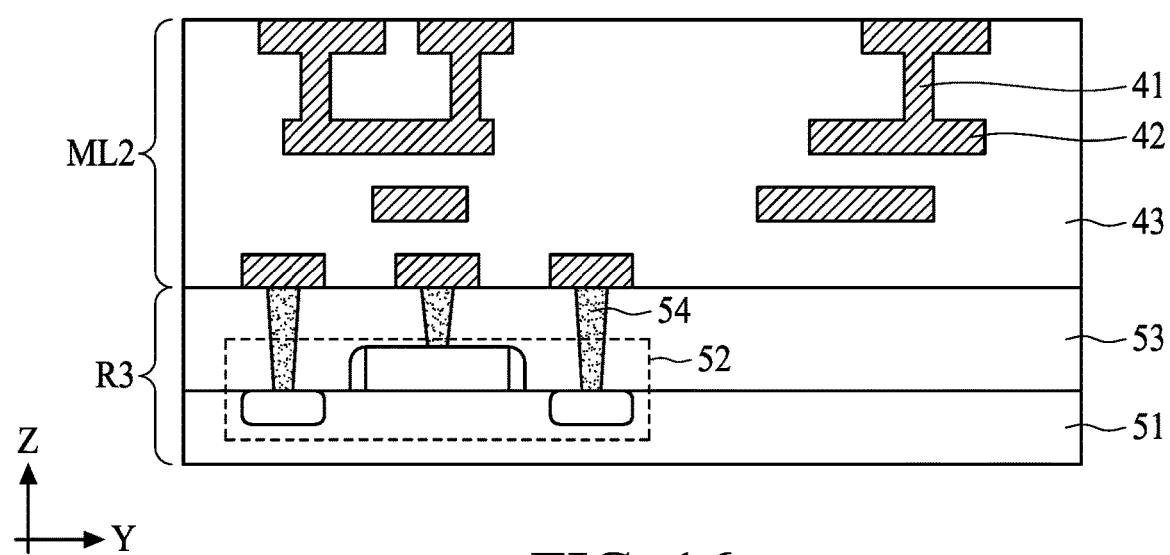

Please refer to FIGS. 14 to 16, which are schematic drawings of a third wafer WF3 in various stages according to aspects of the present disclosure in one or more embodiments. In some embodiments, one or more transistors 52 are formed on a third substrate 51. In some embodiments, the third substrate 51 can be one of a semiconductor substrate, a polysilicon substrate, a single crystalline silicon substrate, a gullium arsenide (GaAs) substrate, a silicon-on-insulator (SOI) substrate, a P-type substrate, an N-type substrate, and a sapphire substrate. In some embodiments, the transistor 52 may include one or more of multigate transistors, fin field-effect transistors (FinFET), and gate-all-around field-effect transistors (GAAFET). In some embodiments, an insulating layer 53 is formed over the third substrate 51, and a plurality of contacts 54 are formed penetrating the insulating layer 53 to electrically connect with the transistors 52. In some embodiments, a logic region R3 includes the third substrate 51 and the transistors 52. In some embodiments, the logic region R3 includes advanced active devices or advanced logic devices, such as devices of generations N7, N5 and N3. In some embodiments, a second interconnect structure ML2 is formed over the logic region R3. In some embodiments, a topmost layer of conductive parts 42 of the second interconnect structure ML2 is exposed. The third wafer WF3 is thereby provided as shown in FIG. 16.

Figure 17:
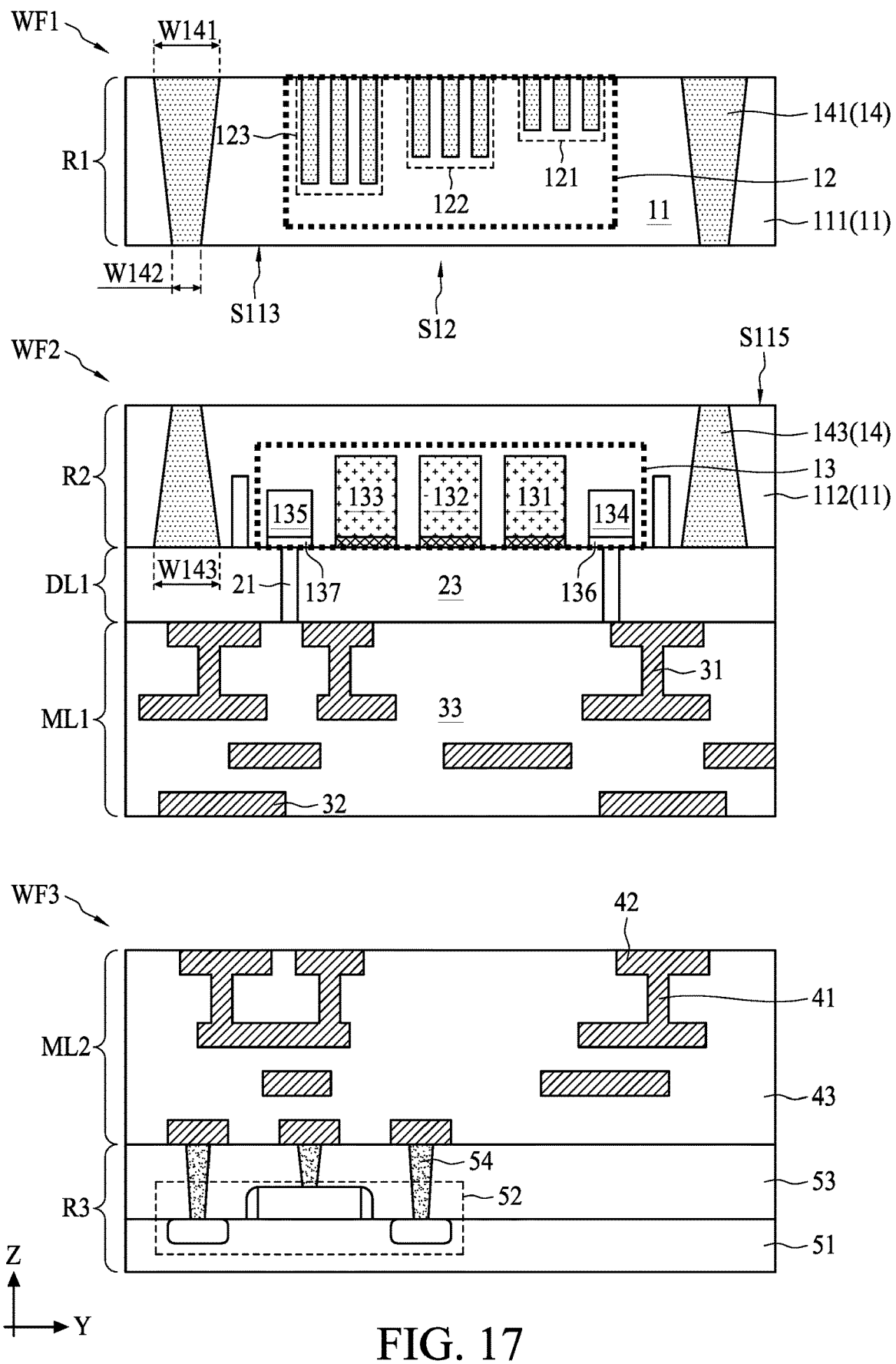
Figure 18:
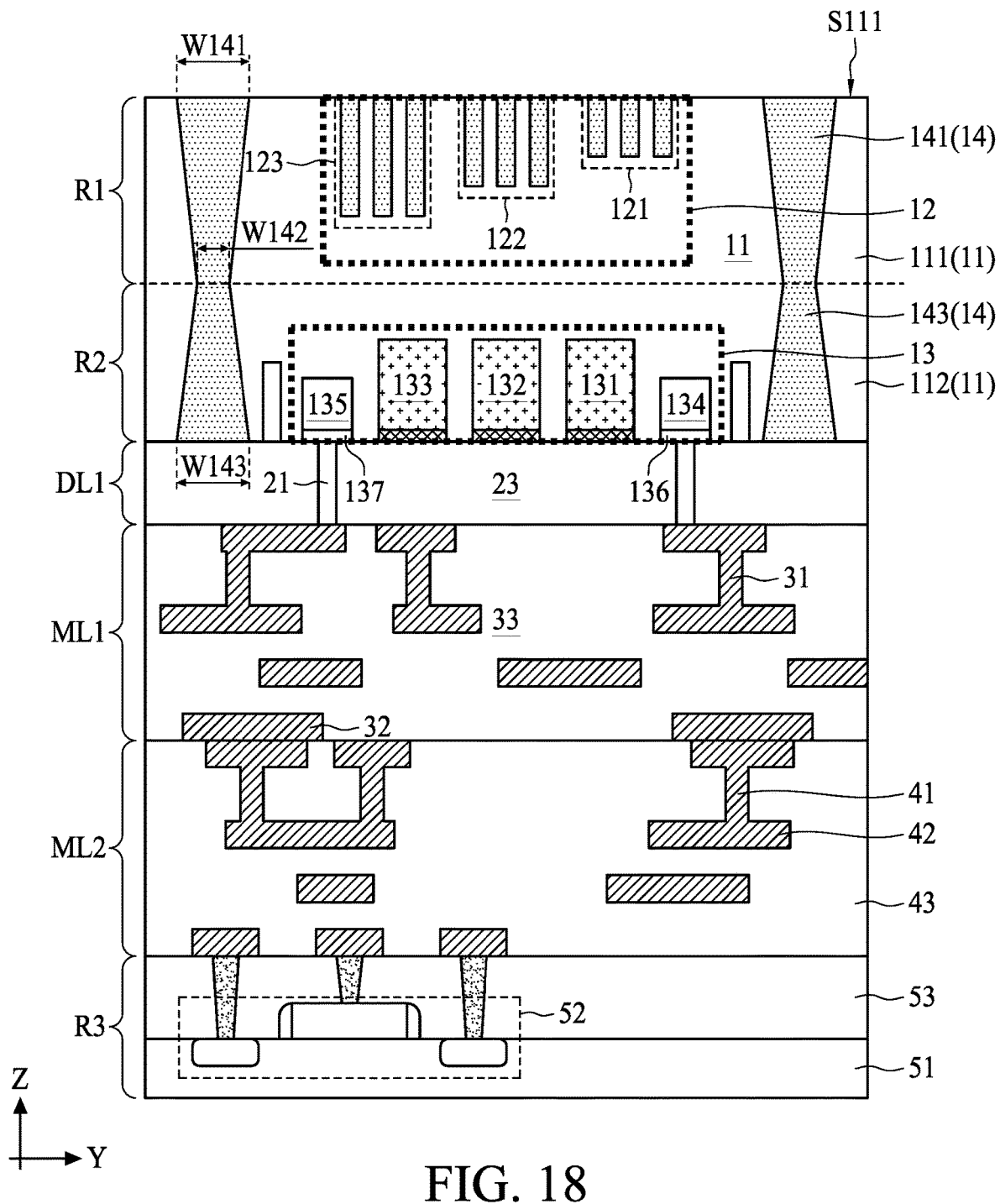

Please refer to FIGS. 17 to 18, which are schematic drawings showing a bonding of the first wafer WF1, the second wafer WF2 and the third wafer WF3 in various stages according to aspects of the present disclosure in one or more embodiments. In the operation 605, the bottom of the first DTI 141 is bonded to the bottom of the second DTI 143. In some embodiments, the first DTI 141 at a second surface S113 of the first substrate 111 is vertically disposed on and faces the second DTI 143 at a second surface S115 of the second substrate 112, in which the second surface S113 is opposite to the first surface S112 as shown in FIG. 9 and the second surface S115 is opposite to the first surface S113 as shown in FIG. 13. In some embodiments, the second wafer WF2 is disposed on the second side S12 of the first wafer WF1. In some embodiments, the second surface S115 of the second substrate 112 contacts the second surface S113 of the first substrate 111. In some embodiments, a bonding interface is formed between the guiding region R1 of the first substrate 111 and the sensing region R2 of the second substrate 112 after a bonding operation. In some embodiments, the configuration of the bottom of the second DTI 143 form a top view and the configuration of the bottom of the first DTI 141 from a top view are substantially symmetrical with respect to the bonding interface. In some embodiments, the bonding interface may not be observed in a final product. In some embodiments, a fusion bonding operation is performed to bond the first wafer WF1 to the second wafer WF2. In some embodiments, a thermal annealing operation is performed to bond the first wafer WF1 and the second wafer WF2. In some embodiments, the first DTI 141 and the second DTI 143 are connected to form a through isolation 14. In some embodiments, a semiconductive layer 11 including the first substrate 111 and the second substrate 112 is formed after the bonding operation. In some embodiments, the guiding structure 12 is vertically aligned over the sensing device 13 in the operation 605.

The second wafer WF2 is bonded to the third wafer WF3 through the exposed conductive parts 32 and the exposed conductive parts 42. In some embodiments, the exposed conductive parts 32 and the exposed conductive parts 42 are at least partially overlapping. In some embodiments, one or more of a fusion bonding operation, a thermal annealing operation, a eutectic bonding operation, a direct metal bonding operation, a hybrid bonding operation are performed to bond the second wafer WF2 and the third wafer WF3. In some embodiments, the third wafer WF3 is vertically aligned over the first wafer WF1 during the bonding operation. In some embodiments, an active device in the logic region R3 overlaps the guiding structure 12 in the guiding region R1 along the vertical direction, or the Z direction. In some embodiments, the bonding of the first wafer WF1 to the second wafer WF2 can be performed prior to, concurrently with, or after the bonding of the second wafer WF2 to the third wafer WF3.

Figure 19:
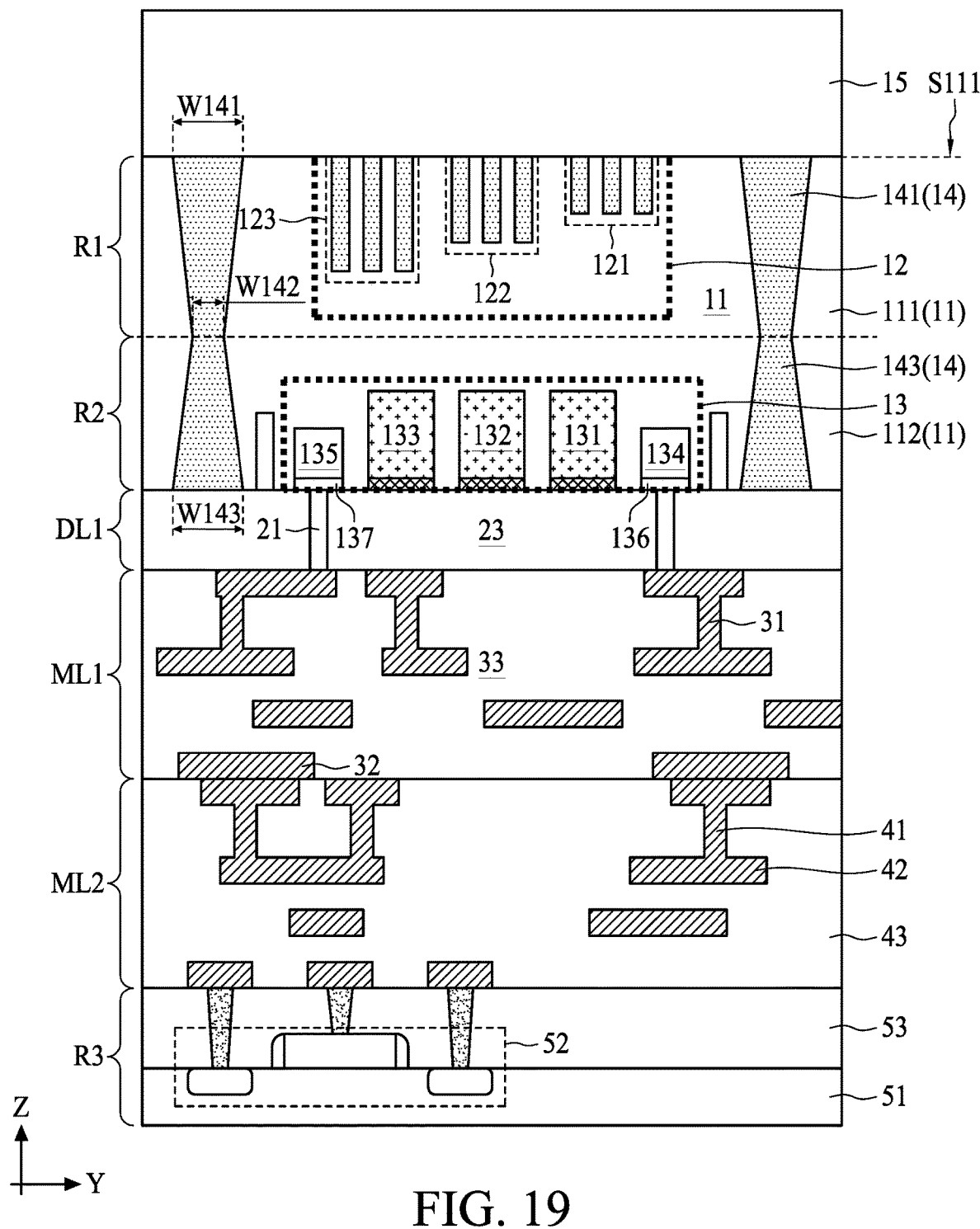
Figure 20:
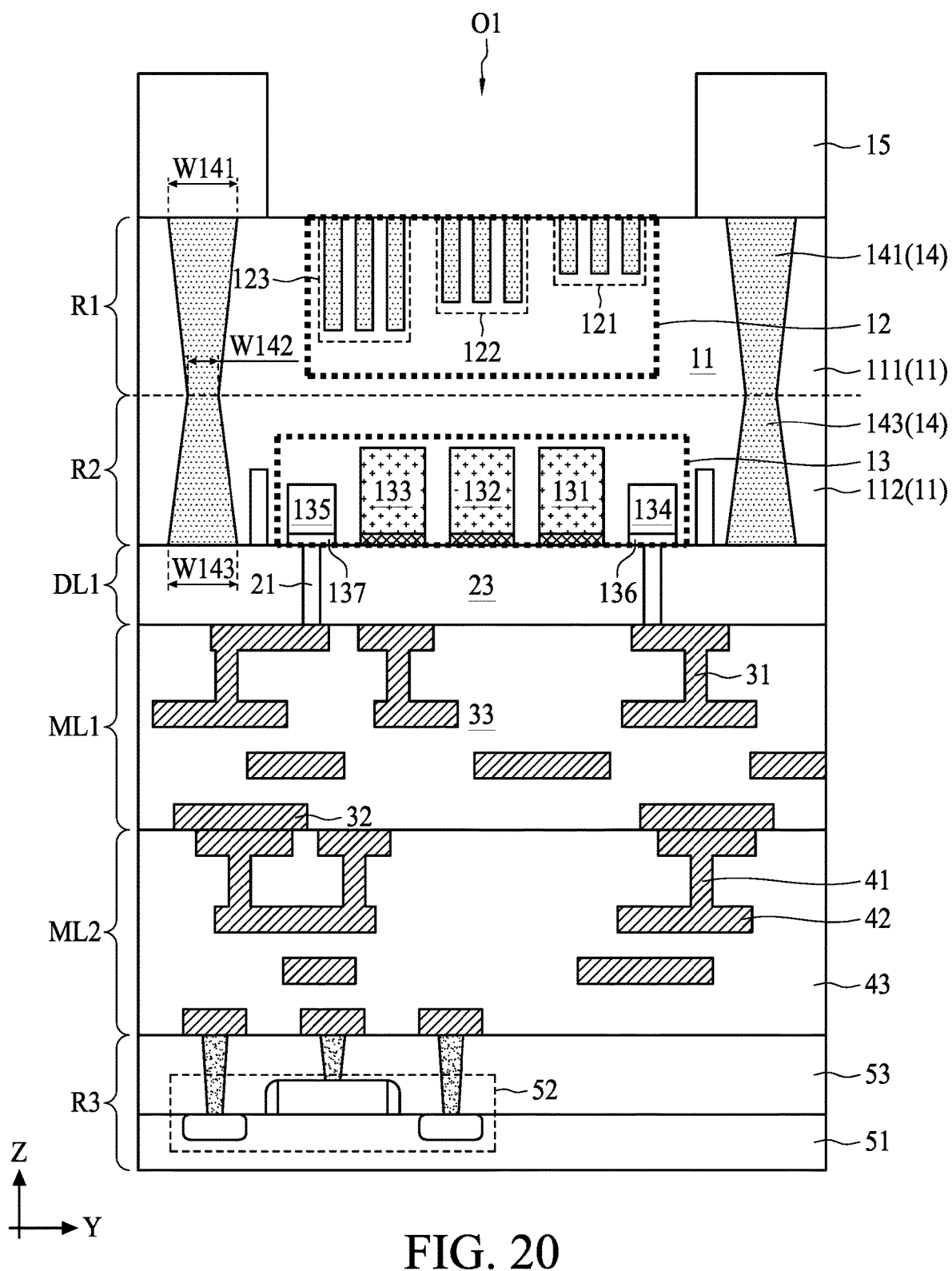
Figure 21:
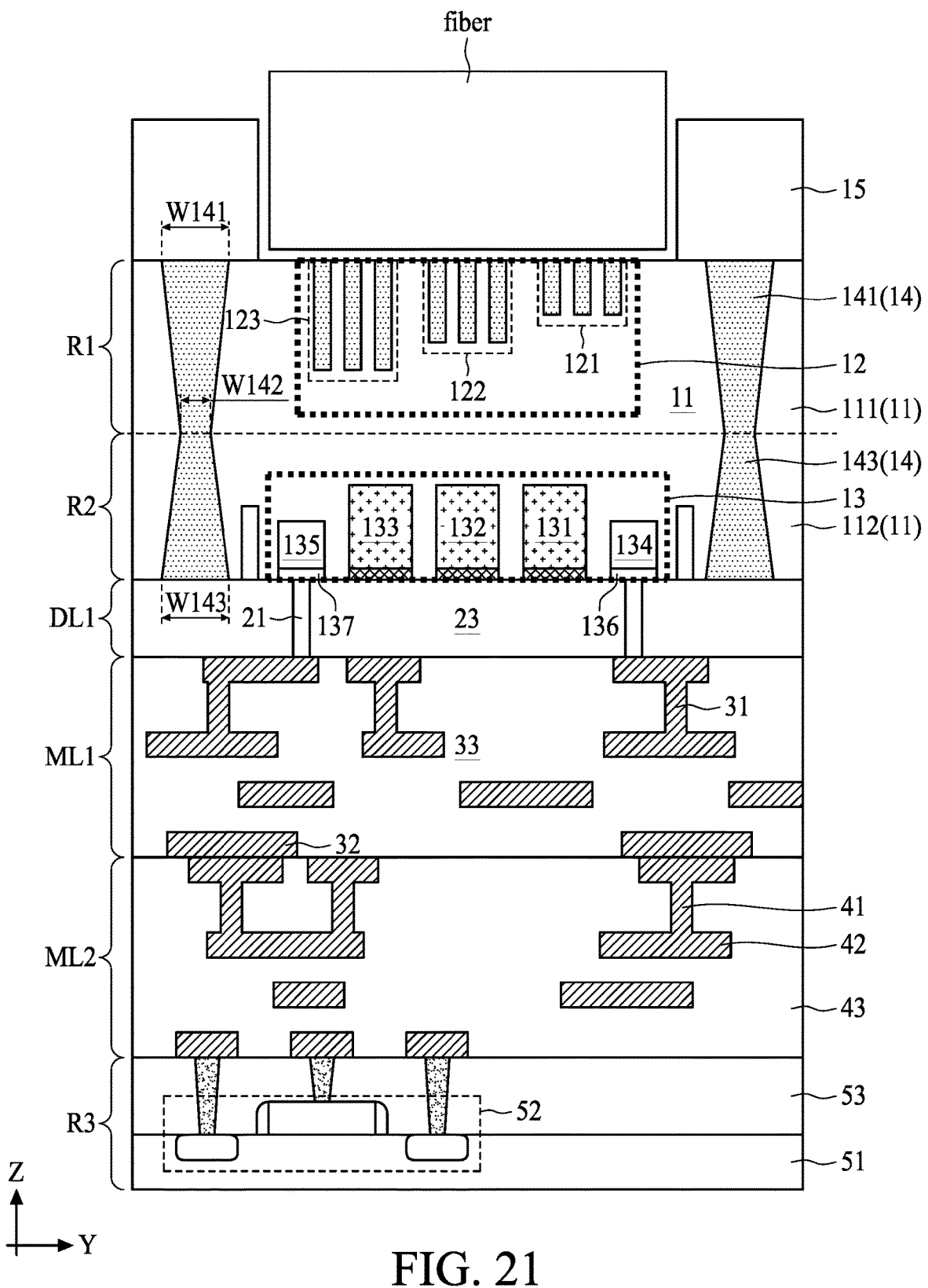

Referring to FIGS. 19 to 21, a supporting structure 15 is formed on the first surface S111 of the semiconductive layer 11. In some embodiments, a deposition is performed to form the supporting structure 15. In some embodiments, the supporting structure 15 includes one or more dielectric materials. In some embodiments, the supporting structure 15 may include oxide, nitride, high-k dielectric materials, low-k dielectric materials or a combination thereof. In some embodiments, the supporting structure 15 supports a disposition of one or more optical fibers. In some embodiments, the supporting structure 15 can include suitable materials with ability of light reflection. A portion of the supporting structure 15 vertically over the guiding structure 12 is removed to form an opening O1, and therefore the gratings of the guiding structure 12 can be exposed to optical signals. In some embodiments, the opening O1 exposes the guiding structure 12 and also portions of the first substrate 11 outside the guiding structure 12 due to a much larger scale of the optical fiber compared to a size of the guiding structure 12. In some embodiments, the supporting structure 15 is disposed on the through isolation 14. In some embodiments, a fiber is then disposed in the opening O1 within the supporting structure 15. The photonic structure 2 is provided as shown in FIG. 21.

The present disclosure provide a photonic structure and a method for forming the photonic structure. The photonic structure includes at least one grating structure, a sensing device, and a logic device vertically stacked in sequence. Optical signals and electrical signals can be vertically transmitted within the photonic device. Therefore, an area of the photonic structure on a substrate can be reduced, and no additional wiring is required to electrically connect the sensing device to the logic device. An overall dimension of the photonic device, or a structure including the photonic device, can be reduced.

In accordance with some embodiments of the disclosure, a photonic structure is provided. The photonic structure includes a guiding region, a sensing region, and logic region. The guiding region has a first side and a second side opposite to the first side. The sensing region is disposed on the second side of the guiding region. The logic region is disposed on a side of the sensing region opposite to the guiding region. The guiding region, the sensing region, and the logic region are stacked along a vertical direction.

In accordance with some embodiments of the disclosure, a semiconductor structure applied in a photonic structure is provided. The semiconductor structure includes a plurality of first trench isolations, a through isolation and a sensing device. The plurality of first trench isolations are disposed in and extend from a first surface of a semiconductive layer. The through isolation penetrates the semiconductive layer. The sensing device is disposed in and at a second surface of the semiconductive layer opposite to the first surface. The first optical signal is transmitted between the first trench isolations and toward a first semiconductive segment of the sensing device. The semiconductive layer and the first semiconductive segment include different semi conductive materials. The through isolation surrounds the plurality of first trench isolations and the sensing device from a top view perspective.

In accordance with some embodiments of the disclosure, a method for manufacturing a photonic structure is provided. The method includes several operations. A grating structure and a first deep trench isolation (DTI) are formed in a first substrate. The first DTI is exposed through the first substrate. The second deep trench isolation (DTI) is formed adjacent to a sensing device in a second substrate. The second DTI is exposed through the second substrate. The first DTI and the second DTI are bonded.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed:

1. A semiconductor structure applied in a photonic device, comprising:
    a plurality of first trench isolations, disposed in and extending from a first surface of a semiconductive layer;
    a through isolation, penetrating the semiconductive layer; and
    a sensing device, disposed in the semiconductive layer and at a second surface of the semiconductive layer, wherein the first surface is opposite to the second surface,
    a first optical signal is transmitted between the first trench isolations and transmitted toward a first semiconductive segment of the sensing device,
    the semiconductive layer and the first semiconductive segment include different semiconductive materials, and
    the through isolation surrounds the plurality of first trench isolations and the sensing device from a top view perspective.

2. The semiconductor structure of claim 1, wherein a middle width of the through isolation is less than a top width of the through isolation from a cross sectional perspective.

3. The semiconductor structure of claim 1, wherein a width of the through isolation gradually decreases from a top toward a middle of the through isolation, and gradually increases from the middle toward a bottom of the through isolation from a cross sectional perspective.

4. The semiconductor structure of claim 1, wherein the plurality of first trench isolations are configured in a triangle from the top view perspective.

5. The semiconductor structure of claim 1, wherein the plurality of first trench isolations are separated from one another, and each of the first trench isolations extends from the first surface toward the sensing device.

6. A semiconductor structure applied in a photonic device, comprising:
    a plurality of first trench isolations, disposed in and extending from a first surface of a semiconductive layer;
    a through isolation, penetrating the semiconductive layer;
    a sensing device, disposed in the semiconductive layer and at a second surface of the semiconductive layer, wherein the first surface is opposite to the second surface,
    a first optical signal is transimitted between the trench isolations and transimitted toward a first semiconductive segment of the sensing device,
    the semiconductive layer and the first semiconductive segment include different semiconductive materials, and
    the through isolation surrounds the plurality of first trench isolations and the sensing device from a top view perspective; and
    a plurality of second trench isolations, disposed in and extending from the first surface of the semiconductive layer.

7. The semiconductor structure of claim 6, wherein a depth of the plurality of second trench isolations is different from a depth of the plurality of first trench isolations.

8. The semiconductor structure of claim 6, wherein a second optical signal is transmitted between the second trench isolations and toward a second semiconductive segment of the sensing device.

9. The semiconductor structure of claim 6, wherein a middle width of the through isolation is less than a top width of the through isolation from a cross sectional perspective.

10. The semiconductor structure of claim 6, wherein a width of the through isolation gradually decreases from a top toward a middle of the through isolation, and gradually increases from the middle toward a bottom of the through isolation from a cross sectional perspective.

11. The semiconductor structure of claim 6, wherein the plurality of first trench isolations are configured in a rectangle from the top view perspective.

12. The semiconductor structure of claim 6, wherein the plurality of first trench isolations are separated from one another, and each of the first trench isolations extends from the first surface toward the sensing device.

13. A semiconductor structure applied in a photonic device, comprising:
 a plurality of first trench isolations, disposed in and extending from a first surface of a semiconductive layer;
 a through isolation, penetrating the semiconductive layer; and
 a sensing device, disposed in the semiconductive layer and at a second surface of the semiconductive layer,
  wherein the first surface is opposite to the second surface,
  a first optical signal is transimitted between the first trench isolations and transimitted toward a first semiconductive segment of the sensing device,
  the semiconductive layer and the first semiconductive segment include different semiconductive materials, and
  the through isolation surrounds the plurality of first trench isolations and the sensing device from a top view perspective, wherein the through isolation encircles the plurality of first trench isolations and the sensing device from the top view perspective.

14. The semiconductor structure of claim 13, further comprising:
 a plurality of second trench isolations, disposed in and extending from the first surface of the semiconductive layer.

15. The semiconductor structure of claim 14, wherein a depth of the plurality of second trench isolations is different from a depth of the plurality of first trench isolations.

16. The semiconductor structure of claim 14, wherein a second optical signal is transmitted between the second trench isolations and toward a second semiconductive segment of the sensing device.

17. The semiconductor structure of claim 13, wherein the through isolation is configured in a circle from the top view perspective.

18. The semiconductor structure of claim 13, wherein a middle width of the through isolation is less than a top width of the through isolation from a cross sectional perspective.

19. The semiconductor structure of claim 18, wherein the top width is in a range of 10 nm to 100 μm.

20. The semiconductor structure of claim 13, wherein a width of the through isolation gradually decreases from a top toward a middle of the through isolation, and gradually increases from the middle toward a bottom of the through isolation from a cross sectional perspective.

* * * * *